United States Patent
Reznik et al.

(10) Patent No.: US 11,356,638 B2
(45) Date of Patent: Jun. 7, 2022

(54) USER-ADAPTIVE VIDEO TELEPHONY

(71) Applicant: VID SCALE, INC., Wilmington, DE (US)

(72) Inventors: Yuriy Reznik, Seattle, WA (US); Gregory S. Sternberg, Mt. Laurel, NJ (US); Ariela Zeira, Huntington, NY (US); Liangping Ma, San Diego, CA (US); Yong He, San Diego, CA (US); Anantharaman Balasubramanian, San Diego, CA (US); Yan Ye, San Diego, CA (US); Louis Kerofsky, San Diego, CA (US); Ralph Neff, San Diego, CA (US); Zhifeng Chen, San Diego, CA (US)

(73) Assignee: VID SCALE, Inc., Wilmington, DE (US)

( * ) Notice: Subject to any disclaimer, the term of this patent is extended or adjusted under 35 U.S.C. 154(b) by 487 days.

(21) Appl. No.: 15/957,887

(22) Filed: Apr. 19, 2018

(65) Prior Publication Data

US 2018/0241966 A1    Aug. 23, 2018

Related U.S. Application Data

(63) Continuation of application No. 14/914,229, filed as application No. PCT/US2014/053457 on Aug. 29, 2014.

(Continued)

(51) Int. Cl.
  *H04N 7/14*  (2006.01)
  *H04N 21/2343*  (2011.01)
(Continued)

(52) U.S. Cl.
  CPC .......... *H04N 7/147* (2013.01); *H04N 7/152* (2013.01); *H04N 21/2343* (2013.01);
(Continued)

(58) Field of Classification Search
  CPC combination set(s) only.
  See application file for complete search history.

(56) References Cited

U.S. PATENT DOCUMENTS 8,259,625 B2   9/2012  Zhan
2003/0174146 A1*  9/2003  Kenoyer ............... H04N 7/147
                                             345/619

(Continued)

FOREIGN PATENT DOCUMENTS

CN       101132516 A       2/2008
CN       101766031 A       6/2010
(Continued)

OTHER PUBLICATIONS

YET, "Talky", Available at https://talky.io/ , retrieved on Feb. 24, 2016, 2 pages.

(Continued)

*Primary Examiner* — Phung-Hoang J Nguyen
(74) *Attorney, Agent, or Firm* — Condon Roccia Koptiw LLP

(57) ABSTRACT

A device may control a video communication via transcoding and/or traffic shaping. The device may include a multipoint control unit (MCU) and/or a server. The device may receive one or more video streams from one or more devices. The device may analyze a received video stream to determine a viewing parameter. The viewing parameter may include a user viewing parameter, a device viewing parameter, and/or a content viewing parameter. The device may modify a video stream based on the viewing parameter. Modifying the video stream may include re-encoding the (Continued)

video stream, adjusting an orientation, removing a video detail, and/or adjusting a bit rate. The device may send the modified video stream to another device. The device may determine a hit rate for the video stream based on the viewing parameter. The device may indicate the bit rate by sending a feedback message and/or by signaling a bandwidth limit.

18 Claims, 32 Drawing Sheets

Related U.S. Application Data

(60) Provisional application No. 61/944,548, filed on Feb. 25, 2014, provisional application No. 61/871,836, filed on Aug. 29, 2013.

(51) Int. Cl.
*H04N 21/422* (2011.01)
*H04N 21/4223* (2011.01)
*H04N 7/15* (2006.01)

(52) U.S. Cl.
CPC ..... *H04N 21/23439* (2013.01); *H04N 21/422* (2013.01); *H04N 21/4223* (2013.01)

(56) References Cited

U.S. PATENT DOCUMENTS

| | | | |
|---|---|---|---|
| 2004/0257434 A1 | 12/2004 | Davis et al. | |
| 2007/0091920 A1 | 4/2007 | Harris et al. | |
| 2009/0033739 A1 | 2/2009 | Sarkar et al. | |
| 2010/0074341 A1* | 3/2010 | Wan | H04N 19/46 375/240.26 |
| 2010/0182394 A1 | 7/2010 | Zhan | |
| 2011/0063407 A1 | 3/2011 | Wang | |
| 2011/0310216 A1 | 12/2011 | Lee et al. | |
| 2012/0274736 A1* | 11/2012 | Robinson | H04N 7/15 348/14.16 |
| 2013/0125155 A1 | 5/2013 | Bhagavathy et al. | |
| 2013/0179931 A1* | 7/2013 | Osorio | G06F 15/167 725/110 |
| 2013/0195204 A1 | 8/2013 | Reznik et al. | |
| 2013/0205163 A1* | 8/2013 | Dorso | H04L 65/1069 714/4.11 |
| 2013/0271559 A1* | 10/2013 | Feng | H04N 7/142 348/14.08 |
| 2014/0009475 A1* | 1/2014 | Setton | G06T 13/80 345/473 |
| 2014/0043495 A1 | 2/2014 | Bateman et al. | |
| 2014/0063174 A1 | 3/2014 | Junuzovic et al. | |
| 2014/0355671 A1 | 12/2014 | Peng et al. | |

FOREIGN PATENT DOCUMENTS

| | | |
|---|---|---|
| CN | 102164209 A | 8/2011 |
| CN | 102215318 A | 10/2011 |
| KR | 10-2008-0047669 A | 5/2008 |
| KR | 10-2011-0015614 A | 2/2011 |
| WO | WO 2009/018197 A1 | 2/2009 |
| WO | WO 2012/015460 A1 | 2/2012 |
| WO | 2013/085544 A1 | 6/2013 |
| WO | WO 2013/109941 A2 | 7/2013 |

OTHER PUBLICATIONS

3rd Generation Partnership Project (3GPP), TS 26.114 V12.1.0, "Technical Specification Group Services and System Aspects, IP Multimedia Subsystem (IMS), Multimedia Telephony, Media Handling and Interaction (Release 12)", Mar. 2013, 277 pages.
Apache Cordova, "Creating Ubuntu Applications with Cordova", Available at http://developer.ubuntu.com/en/phone/apps/html-5/guides/cordova-guide/, retrieved on Jan. 20, 2017, 7 pages.
AT&T, "Video Calling Feature To Be Made Available To LTE Customers on Tiered Data Plans & Deaf and Hard of Hearing Customers With Qualifying Plans", AT&T Expands Facetime Over Cellular Availability, Nov. 8, 2012, 1 page.
Barten, Peter G. J., "Contrast Sensitivity of the Human Eye and its Effects on Image Quality", SPIE Press Book, vol. PM72, Jan. 1, 1999, 226 pages.
Burnett et al., "Media Capture and Streams", W3C Editor's Draft, Available at http://w3c.github.io/mediacapture-main/getusermedia.html , Feb. 22, 2016, 76 pages.
Daly, Scott, "Visible Differences Predictor: An Algorithm for the Assessment of Image Fidelity", MIT Press Cambridge, MA, USA, 1993, pp. 179-206.
Dutton, Sam, "Real-Time Communication without Plugins", Getting Started with WebRTC, Available at http://www.html5rocks.com/en/tutorials/webrtc/basics/, Jul. 23, 2012, pp. 31 pages.
Dutton, Sam, "WebRTC in the Real World: Stun, Turn and Signaling", Available at http://www.html5rocks.com/en/tutorials/webrtc/infrastructure/ , retrieved on Feb. 24, 2016, Nov. 4, 2013, 22 pages.
Google, "Webrtc4all", Available at https://code.google.com/archive/p/webrtc4all/ , retrieved on Feb. 24, 2016, Jul. 22, 2012, 04 pages.
Lundin et al., "A Google Congestion Control Algorithm for Real-Time Communication on the World Wide Web", Network Working Group, draft-alvestrand-rtcweb-congestion-03, Network Working Group, Oct. 22, 2012, 18 pages.
Microsoft, "Sensor and Location Platform", Available at https://msdn.microsoft.com/en-us/library/windows/hardware/dn614612(v=vs.85).aspx , retrieved on Feb. 24, 2016, 3 pages.
Movshon et al., "Analysis of the Development of Spatial Contrast Sensitivity in Monkey and Human Infants", Journal of the Optical Society of America A, Optics and Image Science, vol. 5, No. 12, Dec. 1988, pp. 2166-2172.
Shankland, Stephen, "Mozilla, AT&T Show WebRTC Phone-Web Communications Link", Available at http://www.cnet.com/news/mozilla-at-t-show-webrtc-phone-web-communications-link/ , Feb. 24, 2013, 2 pages.
Wikipedia, "Google Chrome Frame", Available at: https://en.wikipedia.org/wiki/Google Chrome Frame, retrieved on Jan. 20, 2017, 3 pages.
Wikipedia, "WebSocket", Available at https://en.wikipedia.org/wiki/WebSocket , retrieved on Feb. 24, 2016, 5 pages.
KR 10-2008-0047669 A, Cited in Office Action dated Jul. 1, 2017, issued in related Korean Patent Application No. 10-2016-7008336.
CN 101132516 A, US 2010/0182394 A1.
CN 101766031 A, US 2009/0033739 A1.
KR 10-2011-0015614 A, US 2011/0063407 A1.

* cited by examiner

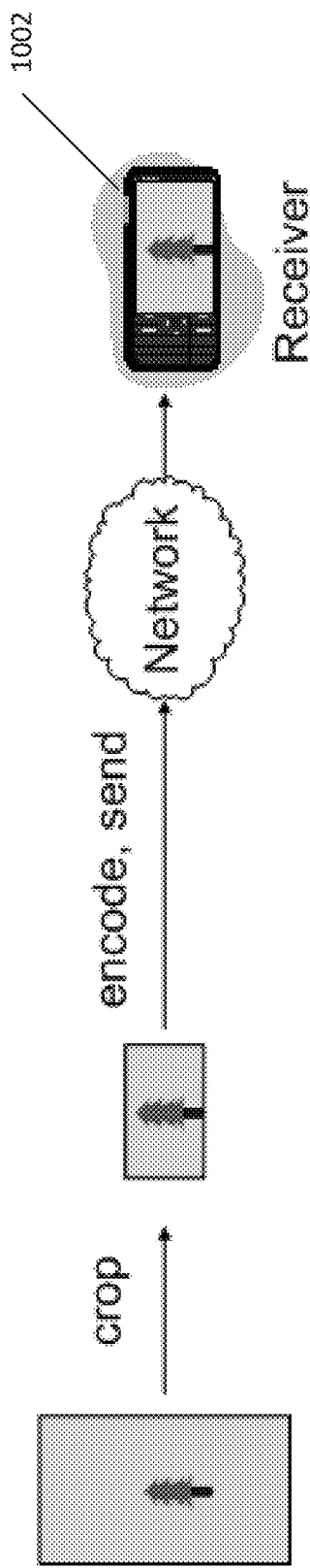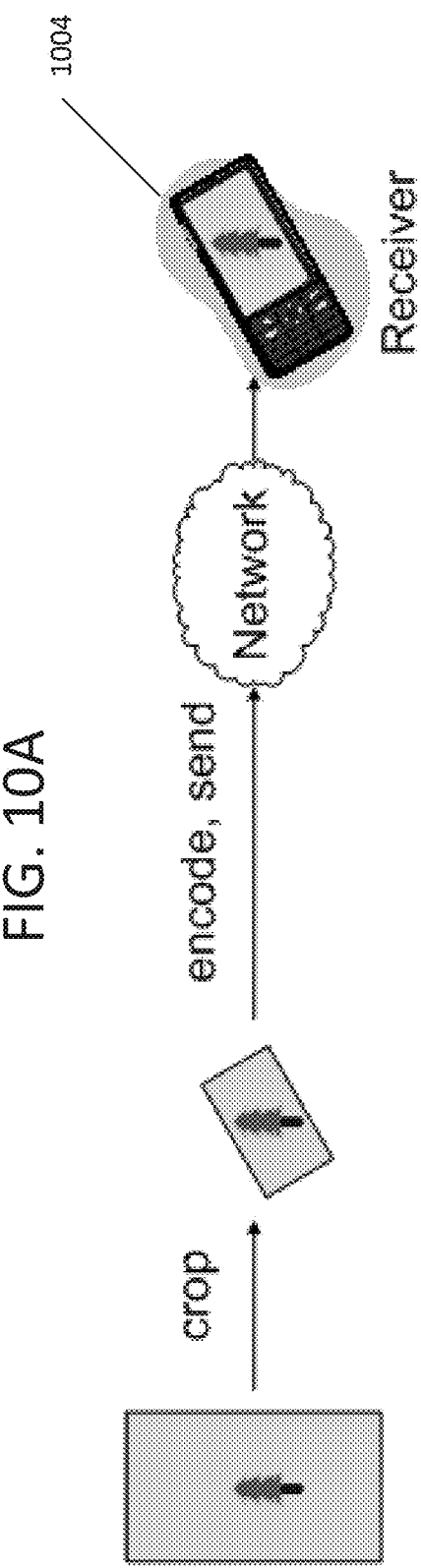
FIG. 10A
FIG. 10B

USER-ADAPTIVE VIDEO TELEPHONY

CROSS REFERENCE TO RELATED APPLICATIONS

This application is a continuation application of U.S. patent application Ser. No. 14/914,229, filed Feb. 24, 2016, which is the National Stage Entry under 35 U.S.C. § 371 of Patent Cooperation Treaty Application No. PCT/US2014/053457, filed Aug. 29, 2014, which claims the benefit of U.S. Provisional Patent Application No. 61/871,836, filed Aug. 29, 2013; and U.S. Provisional Patent Application No. 61/944,548, filed Feb. 25, 2014; the contents of which are incorporated by reference herein.

BACKGROUND

Video telephony is a growing segment of the traffic carried over wireless networks. This trend is expected to continue, as evidenced by the introduction of support for Apple's FaceTime technology delivery over LTE networks. Video telephony systems may be integrated into web browsers without the need for third party plugins. Mobile video telephony systems may not take visual links into account in the capture and processing of the video data.

Real-time video telephony over wireless networks may be characterized by significant bandwidth and latency requirements. Because of the low tolerance to latency in interactive sessions such as video chat, buffering at the receivers may be quite limited. The video decoder may be exposed to the dynamics of the channel characteristics. Some video telephony systems are not robust or reliable in the context of the dynamic wireless channel. Transient congestion and/or temporarily large packet latencies may contribute to poor reliability. In wireless networks, there is often a tradeoff between latency and bandwidth.

SUMMARY

Systems, methods, and instrumentalities are provided for controlling a video communication. A device may control a video communication via transcoding. The device may include a multipoint control unit (MCU). The device may receive a first video stream from a first device and a second video stream from a second device. The device may receive a third video stream from a third device. The device may receive a fourth video stream from the second device. The device may analyze the first video stream to determine a first viewing parameter associated with the first device. The device may analyze the second video stream to determine a second viewing parameter associated with the second device. The device may analyze the third video stream to determine a third viewing parameter associated with the third device. The viewing parameter may include a user viewing parameter, a device viewing parameter, and/or a content viewing parameter. The device may modify the second video stream based on the first viewing parameter and/or the third viewing parameter. The device may modify the first video stream based on the third viewing parameter and/or the second viewing parameter. The device may modify the fourth video stream based on the third viewing parameter. Modifying the video stream may include re-encoding the video stream, adjusting an orientation, removing a video detail, and/or adjusting a bit rate. The device may send the modified second video stream to the first device and/or the third device. The device may send the modified first video stream to the second device. The device may send the modified fourth video stream to the first device and/or the third device. The device may compare bit rates associated with the first viewing parameter and the third viewing parameter. When the third viewing parameter is associated with a higher bit rate than the first viewing parameter, the device may modify the fourth video stream based on the third viewing parameter.

A device may control a video communication via traffic shaping. The device may include an MCU. The device may receive a first video stream from a first device and a second video stream from a second device. The device may determine a viewing parameter associated with the first device by analyzing the first video stream. The viewing parameter may include a user viewing parameter, a device viewing parameter, and/or a content viewing parameter. The device may determine, based on the viewing parameter, a video stream bit rate for the second video stream. The device may indicate the video stream bit rate to the second device. The device may indicate the video stream bit rate by removing one or more packets from the second video stream before sending the second video stream to the first device.

The device may indicate the video stream bit rate by sending a feedback message that indicates an adjusted packet loss rate. The device may measure a packet loss rate for the second video stream. The device may determine the adjusted packet loss rate for the second video stream. The adjusted packet loss rate may be associated with the determined video stream bit rate. The adjusted packet loss rate may differ from the measured packet loss rate. The device may generate a feedback message that indicates the adjusted packet loss rate. The device may send the feedback message to the second device.

The device may indicate the video stream bit rate by signaling a bandwidth limit. The device may determine a first viewing parameter for the first device and a third viewing parameter for a third device. The first viewing parameter may be associated with the first video stream. The third viewing parameter may be associated with a third video stream which may be from the third device. The device may determine a first video stream bit rate for the second video stream and/or a second video stream bit rate for the second video stream. The first video stream bit rate may be based on the first viewing parameter. The second video stream bit rate may be based on the third viewing parameter. The device may indicate a bandwidth limit to the second device. The bandwidth limit may be associated with the first video stream bit rate and/or the second video stream bit rate.

A server may control a video communication between two or more devices. The server may receive a sample of a first video stream from a first device. The server may determine a viewing parameter based on the sample. The viewing parameter may be associated with the first device. The server may indicate a modification to a second video stream based on the viewing parameter. The modification may include adjusting the bit rate, adjusting the resolution, removing detail, adjusting the orientation, and/or filtering. The server may generate a message that indicates the modification to the second video stream. The server may send the message to the second device.

BRIEF DESCRIPTION OF THE DRAWINGS

FIGS. 10A-10B are diagrams illustrating an example of sender-side cropping.

DETAILED DESCRIPTION

A detailed description of illustrative embodiments will now be described with reference to the various Figures. Although this description provides a detailed example of possible implementations, it should be noted that the details are intended to be examples and in no way limit the scope of the application.

Figure 1A:
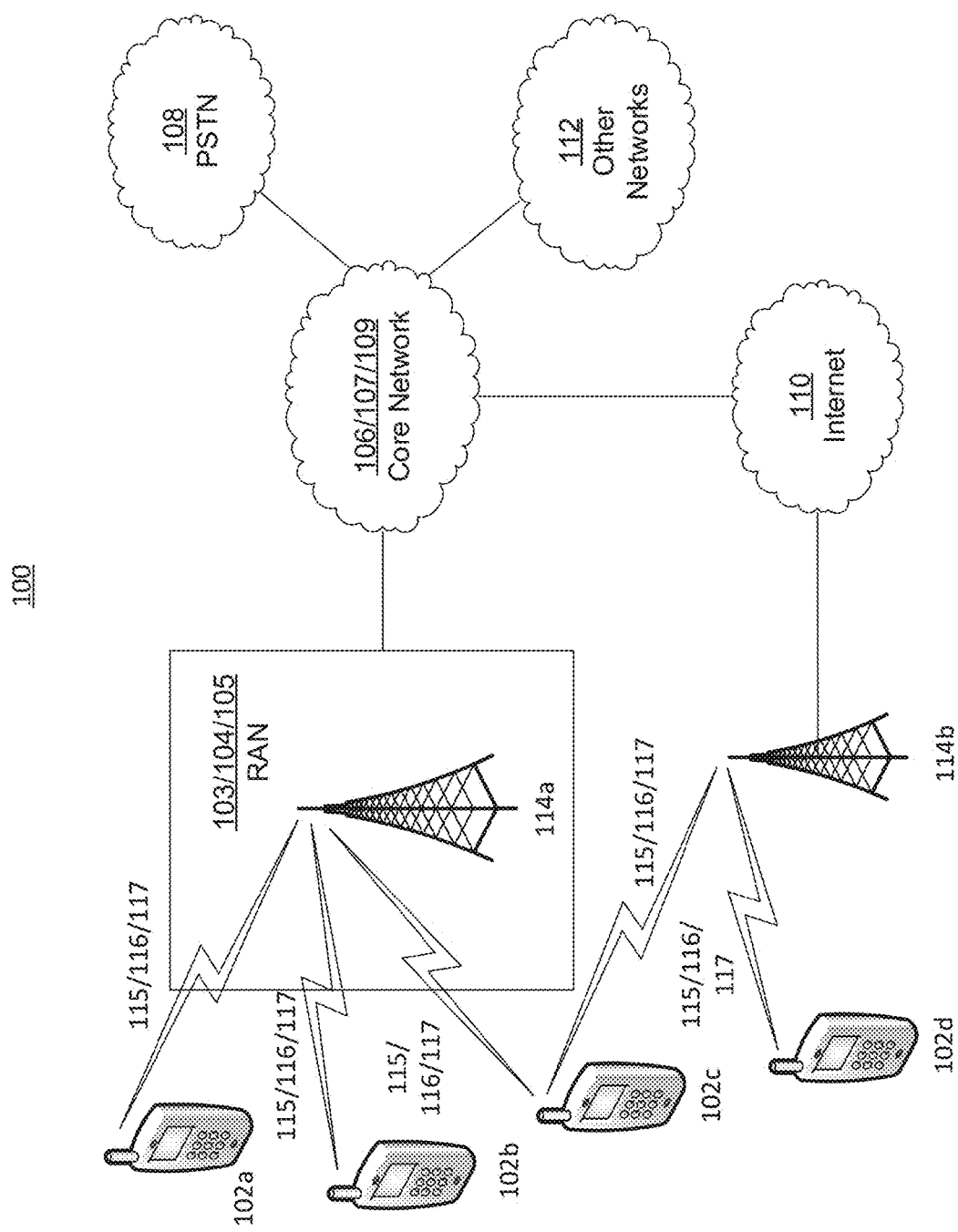
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MEMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
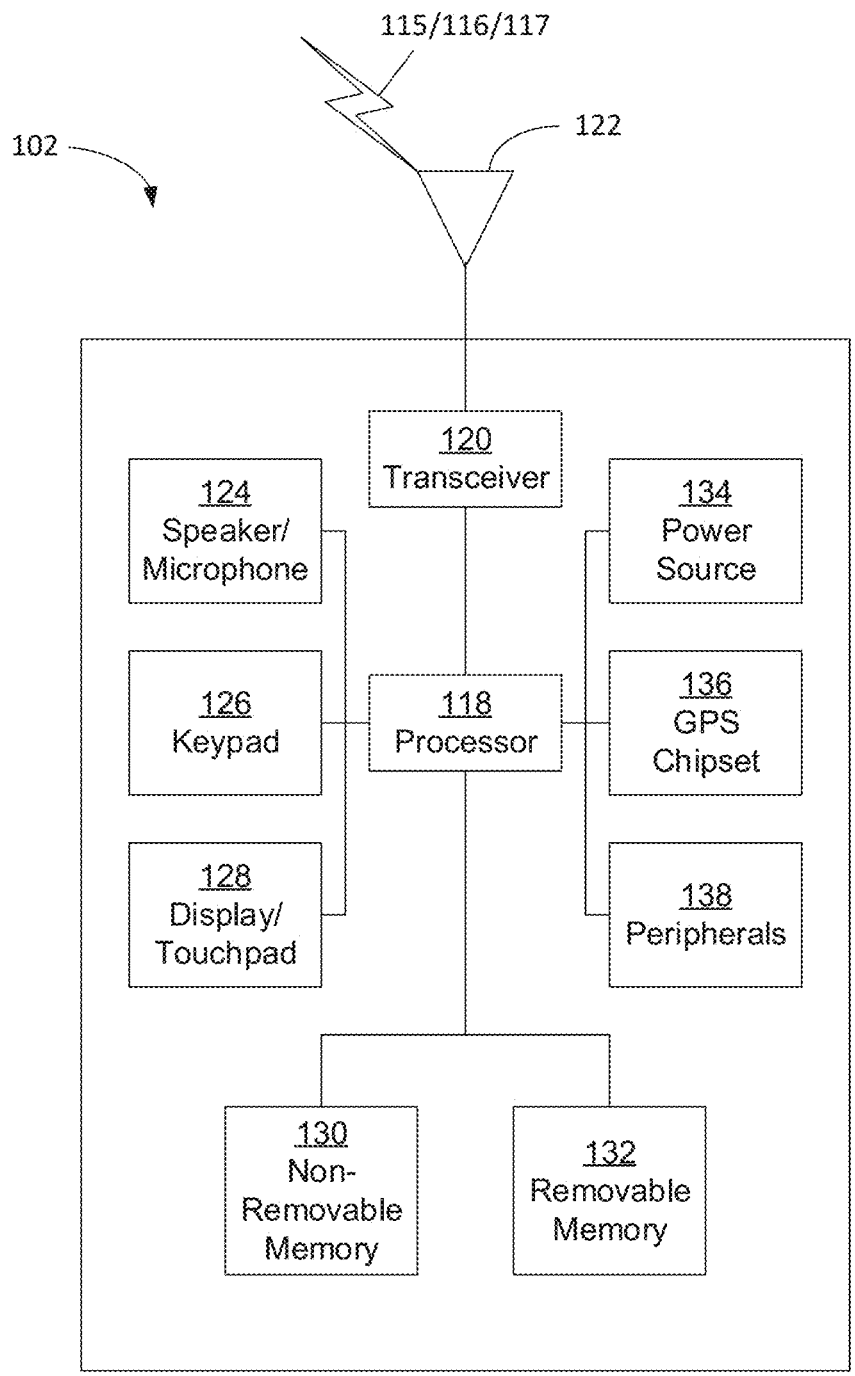
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB or HeNodeB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone. 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station e.g., base stations 114a, 114b) and/or determine its location based on the timing of the signals being received from two or more nearby base stations. It will be appreciated that the WTRU 102 may acquire location information by way of any suitable location-determination implementation while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
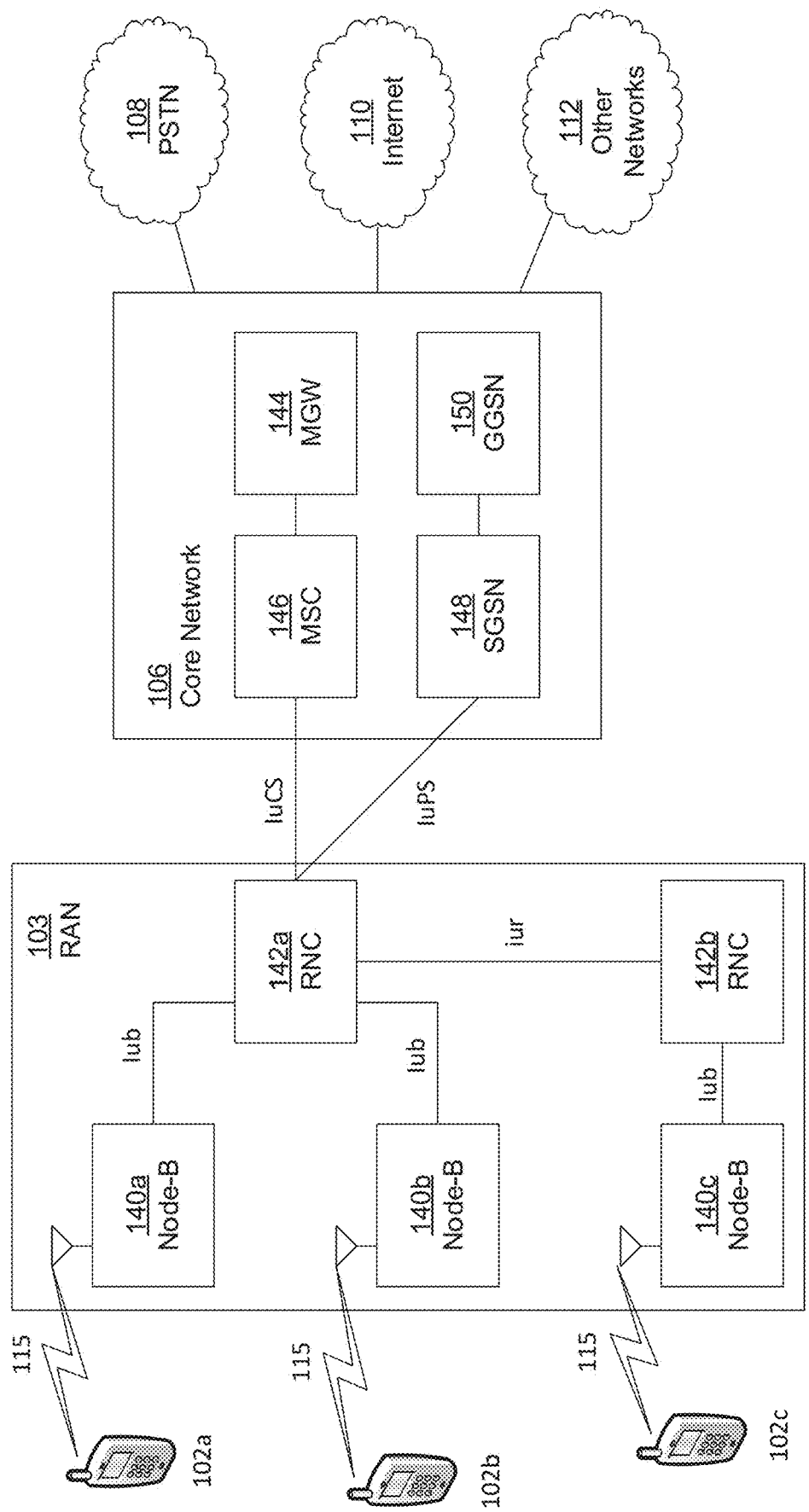
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142*a* in the RAN 103 may be connected to the MSC 146 in the core network 106 via an IuCS interface. The MSC 146 may be connected to the MGW 144. The MSC 146 and the MGW 144 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices.

The RNC 142*a* in the RAN 103 may also be connected to the SGSN 148 in the core network 106 via an IuPS interface. The SGSN 148 may be connected to the GGSN 150. The SGSN 148 and the GGSN 150 may provide the WTRUs 102*a*, 102*b*, 102*c* with access to packet-switched networks, such as the Internet 110, to facilitate communications between and the WTRUs 102*a*, 102*b*, 102*c* and IP-enabled devices.

As noted above, the core network 106 may also be connected to the networks 112, which may include other wired or wireless networks that are owned and/or operated by other service providers.

Figure 1D:
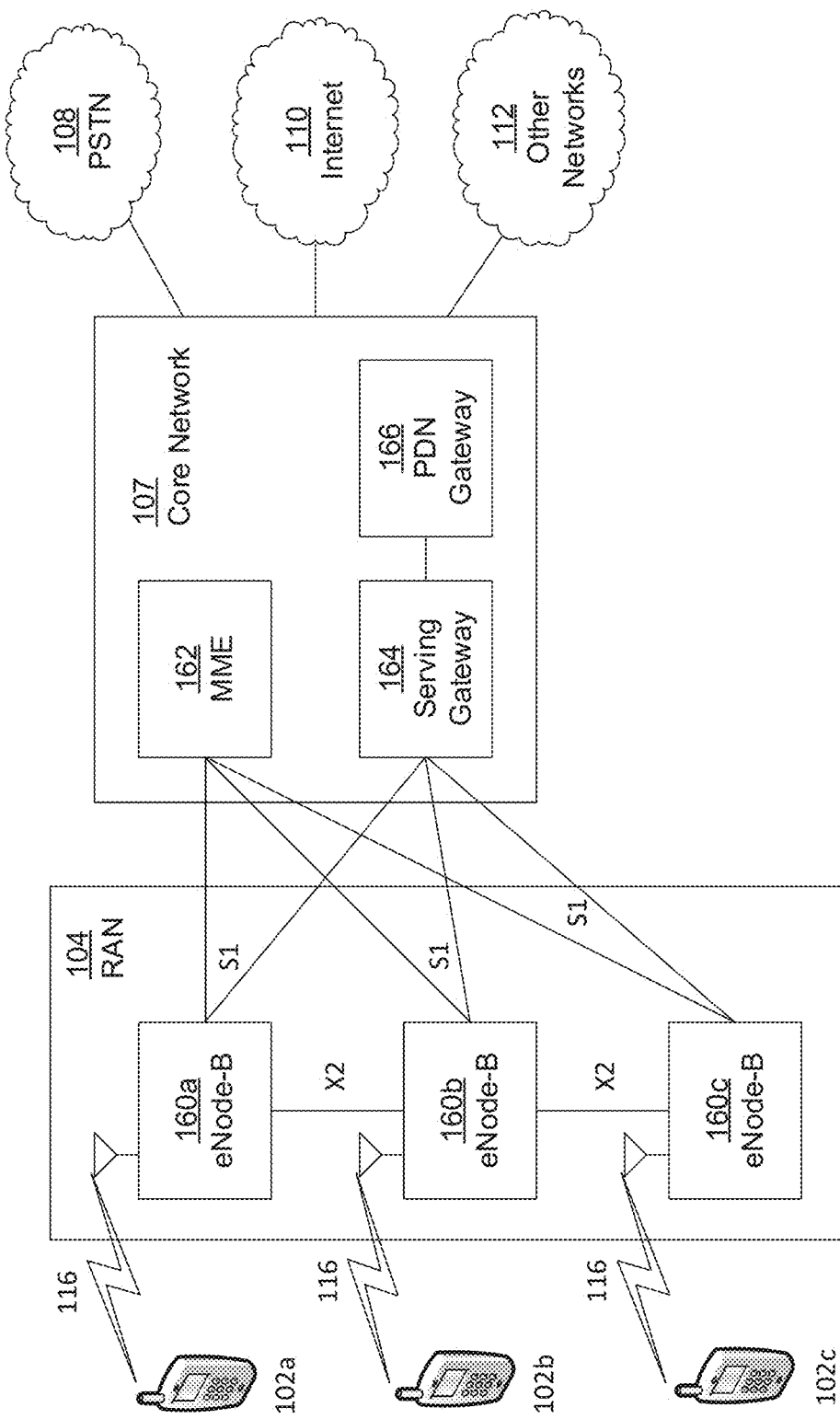
FIG. 1D is a system diagram of another example radio access network and another example core network that may be used within the communications system illustrated in FIG. 1A.

FIG. 1D is a system diagram of the RAN 104 and the core network 107 according to an embodiment. As noted above, the RAN 104 may employ an E-ULTRA radio technology to communicate with the WTRUs 102*a*, 102*b*, 102*c* over the air interface 116. The RAN 104 may also be in communication with the core network 107.

The RAN 104 may include eNode-Bs 160*a*, 160*b*, 160*c* though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the uplink and/or downlink, and the like. As shown in FIG. 1D, the eNode-Bs 160*a*, 160*b*, 160*c* may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160*a*, 160*b*, 160*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160*a*, 160*b*, 160*c* in the RAN 104 via the S1 interface. The serving gateway 164 may generally route and forward user data packets to/from the WTRUs 102*a*, 102*b*, 102*c*. The serving gateway 164 may also perform other functions, such as anchoring user planes during inter-eNode B handovers, triggering paging when downlink data is available for the WTRUs 102*a*, 102*b*, 102*c*, managing and storing contexts of the WTRUs 102*a*, 102*b*, 102*c*, and the like.

The serving gateway 164 may also be connected to the PDN gateway 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The core network 107 may facilitate communications with other networks. For example, the core network 107 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102*a*, 102*b*, 102*c* with access to the networks 112, which may include other wired or wireless networks that are owned and/or operated by other service providers.

Figure 1E:
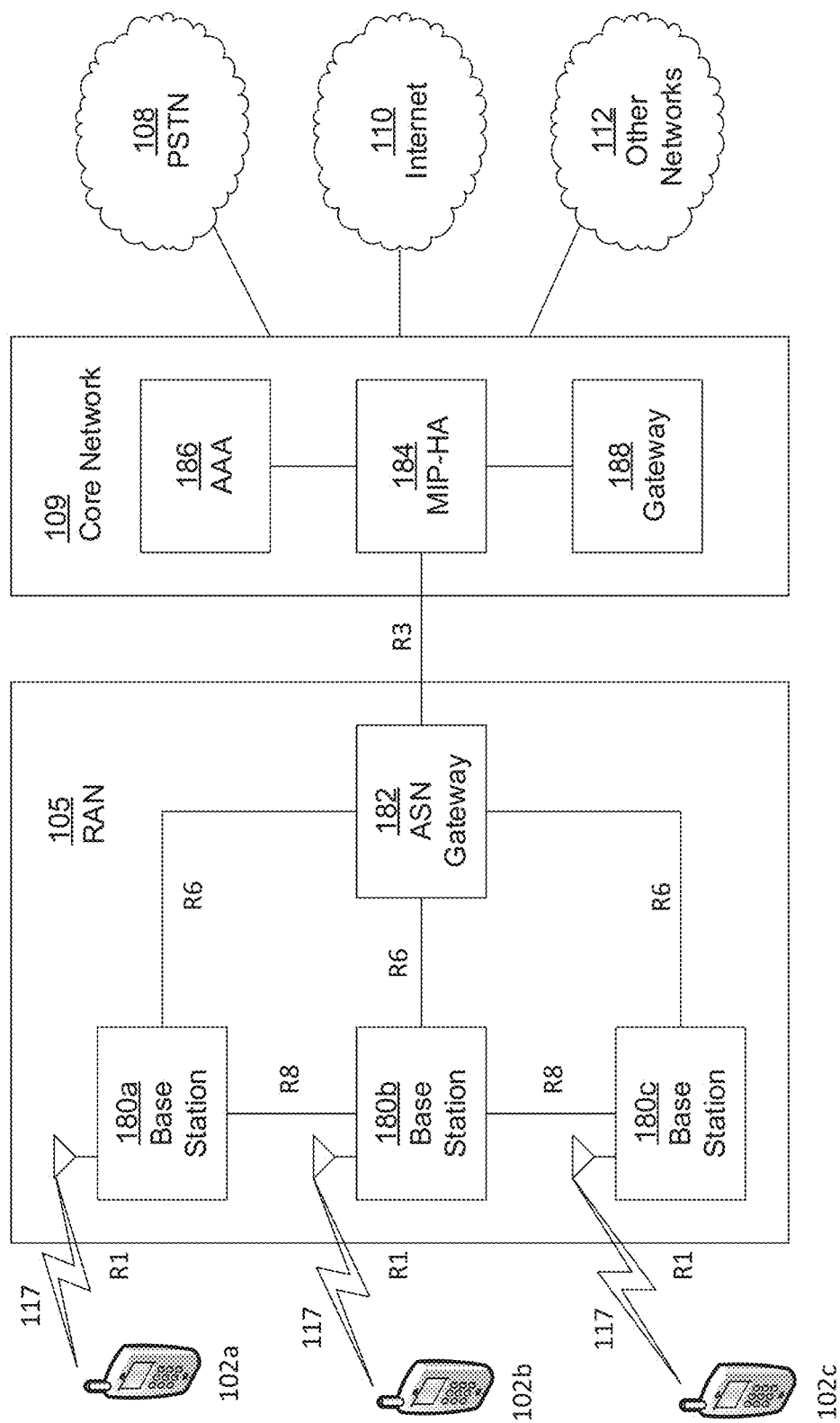
FIG. 1F is a system diagram of another example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102*a*, 102*b*, 102*c* over the air interface 117. As will be further discussed below, the communication links between the different functional entities of the WTRUs 102*a*, 102*b*, 102*c*, the RAN 105, and the core network 109 may be defined as reference points.

As shown in FIG. 1E, the RAN 105 may include base stations 180*a*, 180*b*, 180*c*, and an ASN gateway 182, though it will be appreciated that the RAN 105 may include any number of base stations and ASN gateways while remaining consistent with an embodiment. The base stations 180*a*, 180*b*, 180*c* may each be associated with a particular cell (not shown) in the RAN 105 and may each include one or more transceivers for communicating with the WTRUs 102*a*, 102*b*, 102*c* over the air interface 117. In one embodiment, the base stations 180*a*, 180*b*, 180*c* may implement MIMO technology. Thus, the base station 180*a*, for example, may use multiple antennas to transmit wireless signals to, and receive wireless signals from, the WTRU 102*a*. The base stations 180*a*, 180*b*, 180*c* may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102*a*, 102*b*, 102*c* and the RAN 105 may be defined as an R1 reference point that implements the IEEE 802.16 specification. In addition, each of the WTRUs 102*a*, 102*b*, 102*c* may establish a logical interface (not shown) with the core network 109. The logical interface between the WTRUs 102*a*, 102*b*, 102*c* and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Figure 2A:
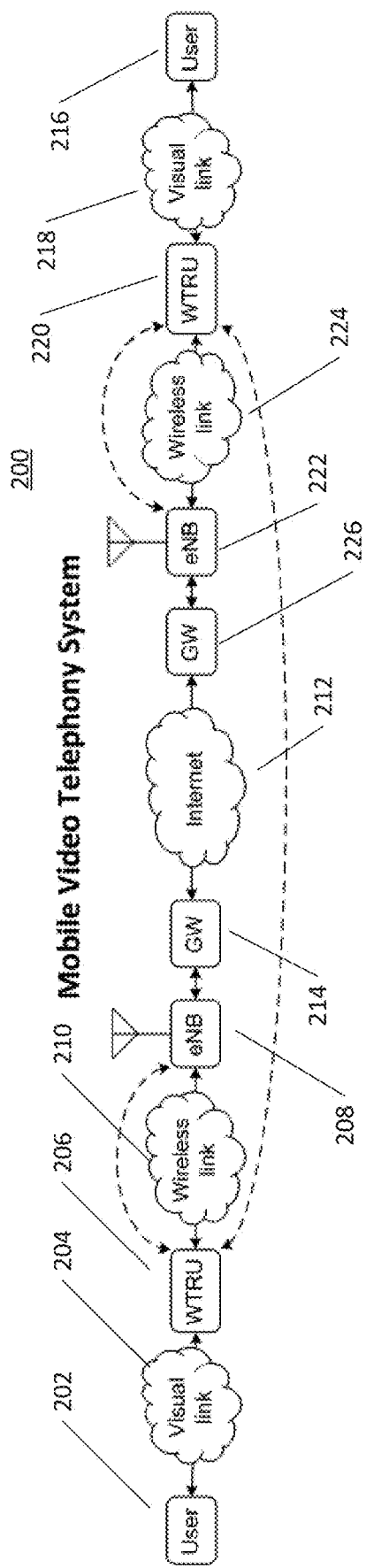
FIG. 2A is a diagram illustrating an example mobile video telephony system.

FIG. 2A illustrates an example mobile video telephony system 200. A first user 202 may have a visual link 204 with a first wireless transmit/receive unit (WTRU) 206. The first WTRU 206 may include a smartphone or tablet. The first WTRU 206 may communicate with a first eNB 208 via a wireless link 210. The first eNB 208 may communicate with a network, such as the Internet 212, via a gateway (GW) 214. A second user 216 may have a visual link 218 with a second WTRU 220. The second WTRU 220 may communicate with a second eNB 222 via a wireless link 224. The second eNB 222 may communicate with the Internet 212 via a GW 226. Embodiments contemplate that other wireless technologies and/or communication paths may be possible for a mobile video telephony system. For example, one or more WTRU's may be connected using IEEE 802.11 technology. The one or multiple eNB's, such as eNB 208 and eNB 222, may be replaced with one or multiple Wi-Fi Access Points.

Systems, methods, and instrumentalities are disclosed for communicating video data and reducing the likelihood of congestion while managing latency and reducing the bandwidth demand while avoiding degradation in video quality. Glare from relatively narrow beam light sources, such as light bulbs, the sun, etc. may be reduced. Backlight brightness may be adapted in response to the overall diffuse illuminance of the background.

Communication of video data may be adapted to user viewing conditions for both streaming and real-time video telephony applications. In the context of real-time video telephony, the front-facing camera may be used, e.g., use of the front-facing camera may be assumed. Buffering may be limited for interactive video telephony sessions. Video telephony may involve the communication of data that is not pre-encoded.

Communication of video data may be adapted to different user/device orientations. Mobile devices in a conversation may exchange orientation information.

A multipoint control unit (MCU) may be used to bridge videoconferencing connections. The MCU may be used to allow more than one endpoints and/or gateways to connect in a multipoint conference. An MCU may provide one or more of the following functions: call setup, admission control, audio mixing, simple voice switching, transcoding between different video formats, rate adaptation, continuous presence (e.g., video mixing where multiple parties may be seen at once), among others, for example. A device (e.g., a video telephony client) may analyze a video stream from another device to determine how to encode the transmitted video. The MCU may analyze the video streams from one or more devices (e.g., individual conference participants) and/or modify one or more of the associated video streams. Analyzing the video stream may include analyzing video packet data, video bit stream data, side information and/or control signaling associated with the video stream. Control signaling may be conveyed, for example, using SIP messages, H.245 messages, HTTP requests/responses, and/or the like. The MCU may signal (e.g., indicate) a video stream modification to one or more of the devices (e.g., the individual endpoints). One or more of the devices may implement user adaptive video telephony. One or more of the devices may implement user adaptive video telephony based on the signal from the MCU.

A visibility of information may be determined based on one or more factors associated with information displayed on a display. For example, perceptible detail and/or imperceptible detail may be recognized in displayed video content. The difference between perceptible detail and imperceptible detail may be determined. A number of factors may be used to determine the visibility of information displayed on a display. These factors may include a viewing parameter. The viewing parameter may include one or more of: viewing distance (e.g., distance of user to screen), contrast sensitivity, display size, display pixel density, ambient illumination, motion of the display relative to the user, and other factors, for example. The flexibility in usage of mobile devices may contribute to the variability of the viewing parameters. For example, a mobile device held at arms-length away from the user may present information at a higher spatial density, compared to a device held closer to (e.g., inches from) the user's face. As another example, visibility of information on the mobile device display may be lower when the device is viewed under direct sunlight than when the device is viewed in a dark room. As another example, the user may perceive less detail if the device is in motion relative to the user's eyes (e.g., the user is walking down a busy street holding a phone in his hand), than when the device is not in motion e.g., the user is sitting in a chair holding the phone).

One or more viewing parameters may be used to determine and/or to estimate the amount of detail that a user could perceive (e.g., by utilizing models of human visual perception). The encoding and/or sending of video content may be adapted (e.g., modified) based on viewing parameter(s). The modified encoding and/or sending of video content may preserve one or more details that may be perceptible to the user. The modified encoding and/or sending of video content may preserve perceptible details. For example, a pre-processing filter may remove details that the viewing user might not perceive Oven the current viewing conditions). Pre-processed video content may be encoded (e.g., re-encoded) using a lower bit rate than the original video content. The properties of video capture, re-sampling, and/or encoding may be modified (e.g., directly adapted). The properties of video capture, re-sampling, and/or encoding; may be modified to capture a level of detail (e.g., a highest level) that the viewing user can perceive, based on the current viewing conditions and/or viewing parameters. The video content may be encoded using a video resolution (e.g., a lowest level) and/or a bit rate (e.g., a lowest bit rate), to preserve the amount of detail which the viewing user may be capable of perceiving. The properties of video capture, re-sampling, and/or encoding (e.g., a video resolution or a bit rate) may be determined based on human visual perception models. The properties of video capture, re-sampling, and/or encoding may be determined experimentally.

Figure 2B:
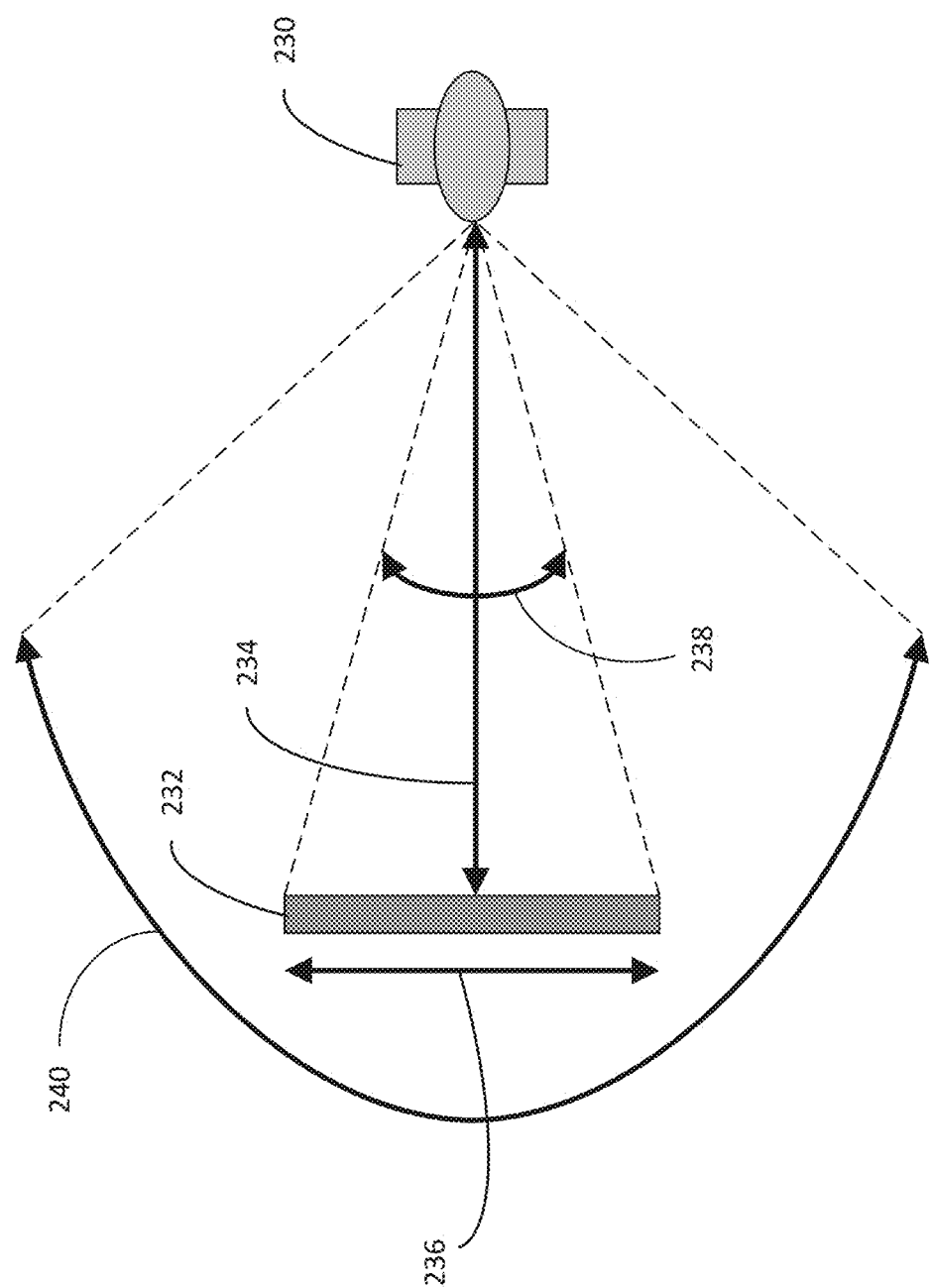
FIG. 2B is an illustration of example parameters of a viewing setup.

FIG. 2B illustrates some example parameters (e.g., viewing parameters) of video viewing setup. For purposes of illustration, a horizontal slice is shown, and it is assumed that the visual field is formed by binocular vision (e.g., it is about 120° horizontally). The viewing parameters may include screen size, distance to the screen, screen resolution, screen density (in pixels per inch), and/or viewing angle. Viewing parameters may be interrelated. For example, viewing angle may be computed as:

$$\text{viewing angle} = 2 \arctan\left(\frac{\text{screen width}}{2 \cdot \text{distance}}\right).$$

Contrast or luminance contrast is a perceptual measure (e.g., viewing parameter) that may define the difference between the perceived lightness of two colors. The contrast of a periodic pattern such as sinusoidal grating may be measured using Michelson's contrast defined as:

$$C = \frac{L_{max} - L_{min}}{L_{max} + L_{min}},$$

where $L_{max}$ and $L_{min}$ are the maximum and minimum luminance values, respectively. The contrast may be defined as:

$$C = \frac{(L_{max} - L_{min})/2}{(L_{max} + L_{min})/2} = \frac{\text{Amplitude}}{\text{Average}}.$$

The level of contrast that may be useful to elicit a perceived response by the human visual system may be the contrast threshold, and the inverse of the contrast threshold may be the contrast sensitivity. Contrast sensitivity may be computed as follows $$\text{Contrast sensitivity} = \frac{1}{\text{Contrast threshold}} = \frac{\text{Average}}{\text{Amplitude}}$$

Figure 2C:
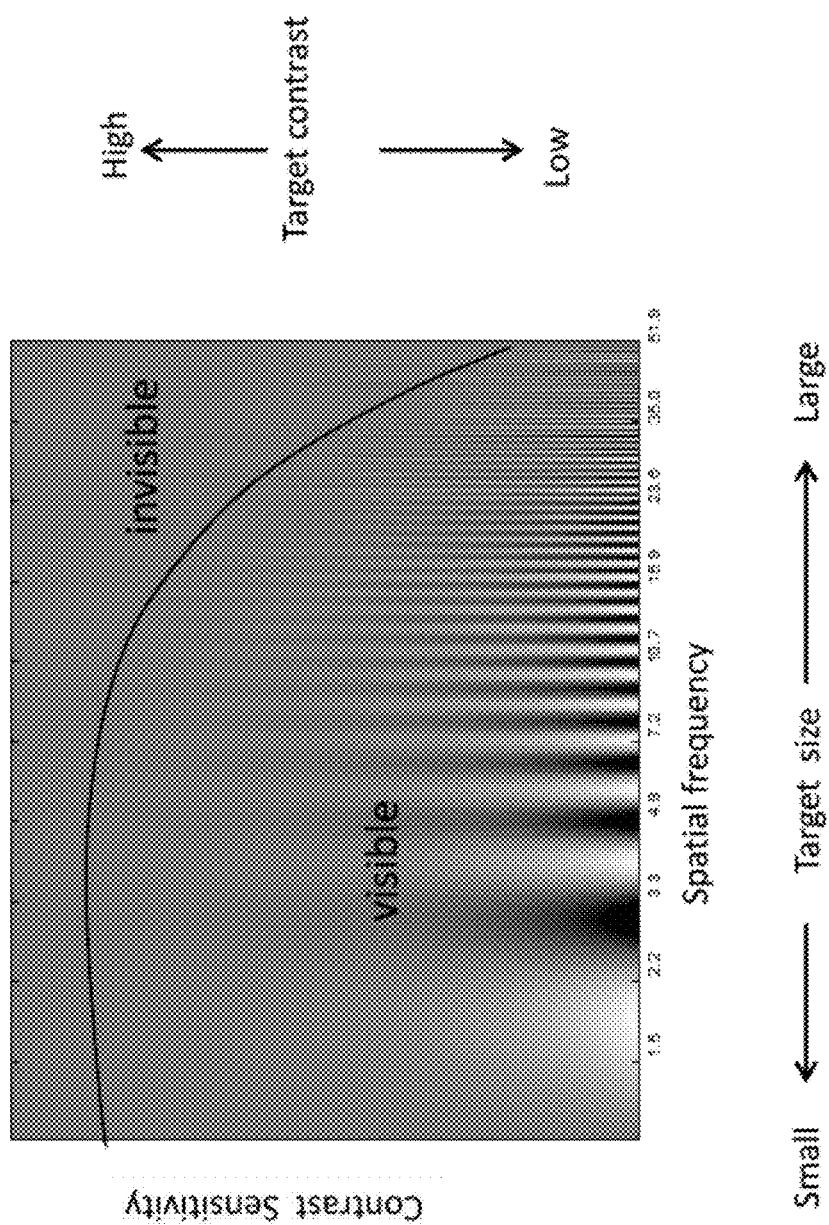
FIG. 2C is an illustration of an example of contrast sensitivity function using a Campbell-Robson chart.

FIG. 2C is an illustration of an example of a contrast sensitivity function using a Campbell-Robson chart. Contrast sensitivity may vary as a function of spatial frequency. In a Campbell-Robson chart, spatial frequency increases logarithmically from left to right and contrast decreases logarithmically from bottom to top. The relationship between contrast sensitivity and spatial frequency is called the contrast sensitivity function (CSF) and the CSF curve is illustrated in FIG. 2C.

The CSF may have a maximum at 4 cycles per degree (CPD). The CSF may decrease at both lower and higher frequencies (e.g., thereby yielding a band pass characteristic). The CSF curve may define a threshold of visibility. The region above the CSF curve may be invisible to a human observer. Several different CSF models may be used, such as the models by Movshon and Kiorpes, Barten, and Daly.

Figure 3:
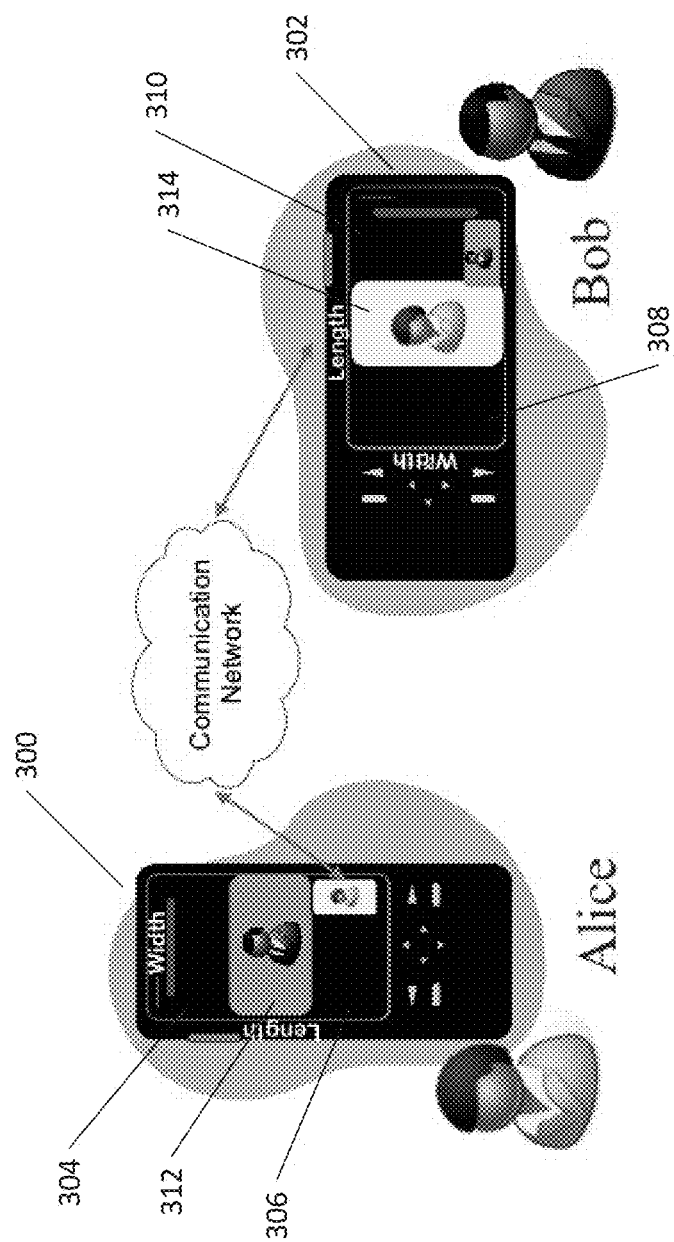
FIG. 3 illustrates an example video telephony session between WTRUs of differing orientations.

FIG. 3 illustrates an example video telephony session between WTRUs 300, 302 of differing orientations. In the example shown in FIG. 3. WTRUs 300, 302 may conduct a two-way video calling session. The best video quality/experience may be achieved when the orientation of WTRUs 300, 302 match (e.g., when both WTRUs 300, 302 are in a portrait orientation or in a landscape orientation). When the orientations of WTRUs 300, 302 are not aligned (e.g., when WTRU 300 is in a portrait orientation and WTRU 302 is in a landscape orientation as depicted in FIG. 3), the received image (e.g., video and/or picture) may be reformatted. The received image may be down sampled and displayed in a pillbox format, with black bars 304, 306, 308, 310 placed on the side of the image 312, 314. The down sampled image and reformatted image may degrade (e.g., significantly degrade) the user experience. A portion (e.g., only a portion) of the video/picture, of the original resolution that is coded and transmitted across the communication network, may be displayed. Displaying a portion of the video/picture may waste resources (e.g., bandwidth) of the communication system.

Figure 4:
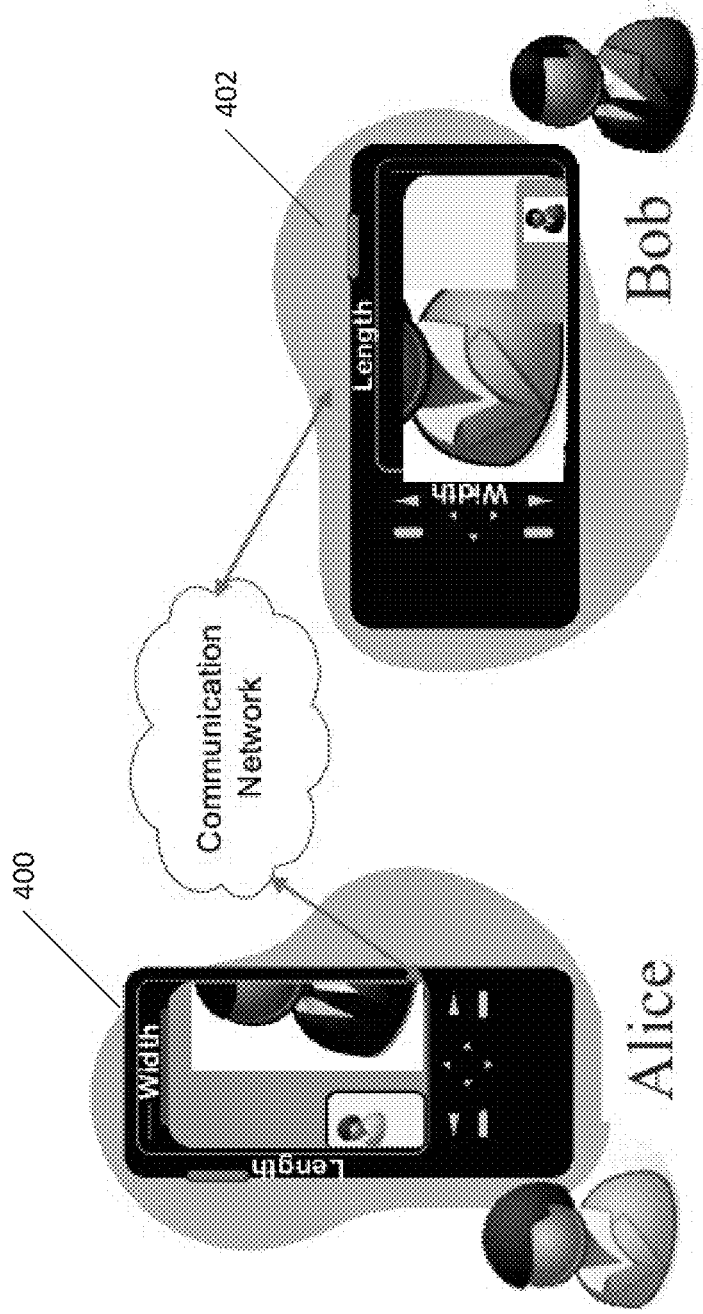
FIG. 4 illustrates an example video telephony session between WTRUs of differing orientations.

FIG. 4 illustrates an example video telephony session between WTRUs 400, 402 of differing orientations. In the example shown in FIG. 4, WTRUs 400, 402 may conduct a two-way video calling session. The video stream may be captured (e.g., at the sender of the video) based on the orientation of the sender WTRU. For example, the sender WTRU may capture video in a landscape format when the sender WTRU is oriented in a landscape orientation, such as WTRU 402. The receiver WTRU may crop the received video stream to match the orientation of the receiver WTRU. For example, the receiver WTRU may crop a received landscape video stream to a portrait format when the receiver WTRU is oriented in a portrait orientation, such as WTRU 400. Cropping the video (e.g., inappropriately) may lead to loss of important objects in the scene. Sending the entire video across the communication system may be inefficient if part of the video may not be displayed at the receiver end.

Viewing conditions may be estimated. Viewing conditions may include one or more viewing parameters. Because the video from the camera of a WTRU may be available on both a local WTRU and a remote WTRU of a video telephony session, the viewing conditions may be estimated by either the local WTRU or the remote WTRU.

A viewing parameter may be signaled (e.g., indicated) to the remote WTRU (e.g., when the local WTRU estimates the viewing parameter). For example, the viewing parameter may be signaled using SEI messages embedded in the video bit stream, extensions of control protocol messages (e.g., H.245 in H.323 stack), APP messages sent over RTCP, and/or additional protocols (e.g., custom protocols).

Face detection and/or distance estimation logic may be applied to the received video stream (e.g., when the remote WTRU estimates the viewing parameter). Remote WTRU estimation (e.g., remote-end estimation) can be deployed without any changes in standards. Remote WTRU estimation may work well with high-resolution and/or high quality conferencing. Face recognition may benefit from high-resolution conferencing. Ambient light estimation may include auto-exposure logic. Remote WTRU estimation may include knowledge of the pixel density of the display on the other end (e.g., the local WTRU display) of the video telephony session.

Figure 5:
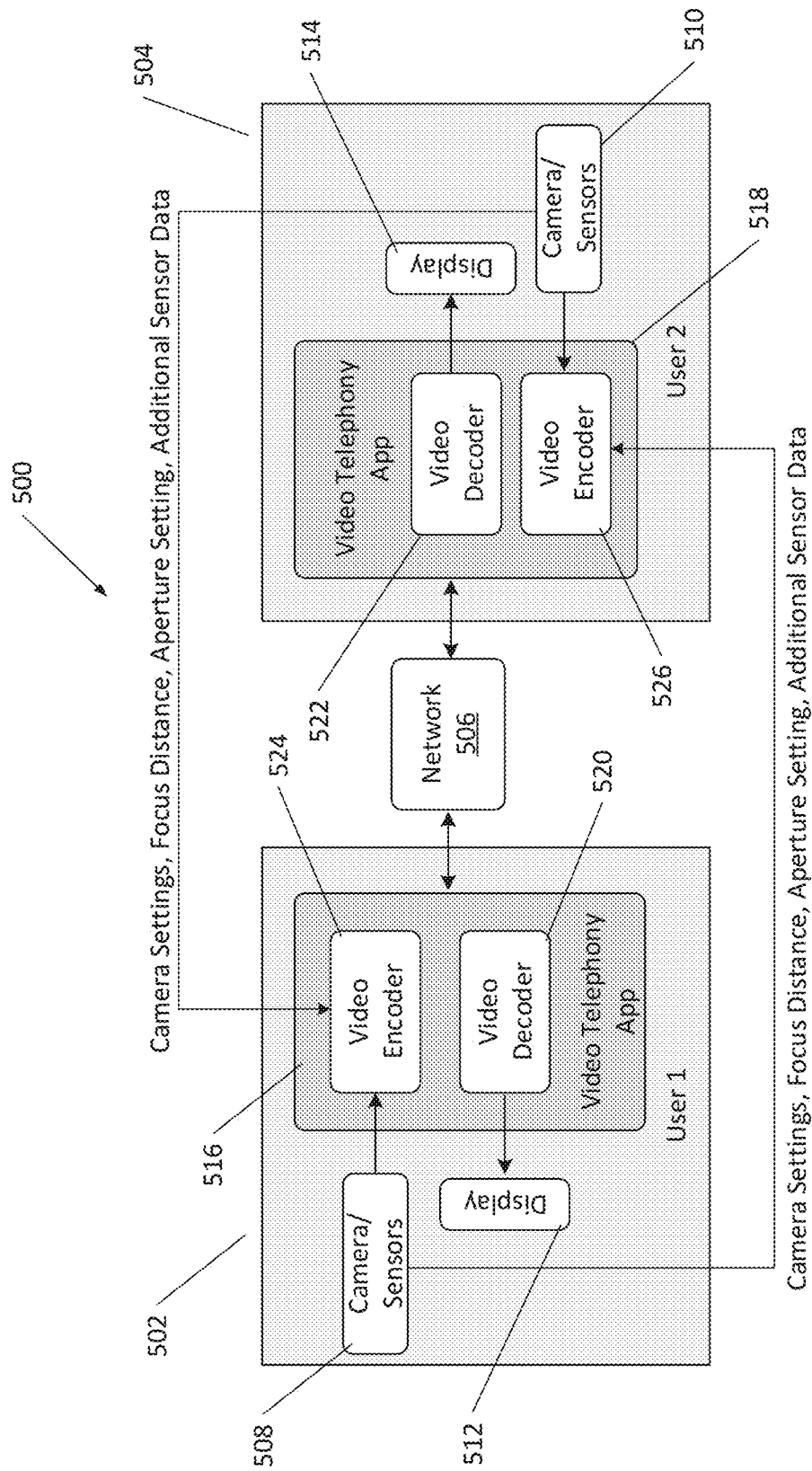
FIG. 5 is a diagram illustrating an example video telephony system comprising WTRUs in communication with one another via a network.

The video stream may contain information that may be used to infer certain aspects of the user viewing conditions. Viewing condition information (e.g., one or more viewing parameters) in addition to the video stream may be signaled, as shown in FIG. 5. FIG. 5 illustrates an example video telephony system 500 that includes WTRUs 502, 504 in communication with one another via a network 506, such as the Internet. The WTRUs 502, 504 may include respective cameras/sensors 508, 510 and respective displays 512, 514. The WTRUs 502, 504 may execute respective video telephony applications 516, 518. The video telephony applications 516, 518 may be stored in memory devices. The video telephony applications 516, 518 may include respective video decoders 520, 522 and respective video encoders 524, 526.

As shown in FIG. 5, the camera/sensor 508 of the WTRU 502 may signal one or more viewing parameters to the WTRU 504 (e.g., the video encoder 526 of the WTRU 504). The camera/sensor 510 of the WTRU 504 may signal the one or more viewing parameters to the video encoder 524 of the WTRU 502. The one or more viewing parameters may be signaled from a first WTRU to a second WTRU. The one or more viewing parameters may be used to encode video using a video encoder of the second WTRU. The one or more viewing parameters may include, but not limited to, for example, camera settings, focus distance, aperture settings, and/or additional sensor data, such as ambient illuminance, accelerometer data, proximity detection, etc. The one or more viewing parameters may be signaled for use in rate selection and/or perceptual pre-filtering at the remote WTRU (e.g., an encoder at the remote WTRU).

Signaling viewing condition information (e.g., one or more viewing parameters) in addition to a video stream may reduce latency because the video encoding and/or decoding is not in the signaling path. Signaling one or more viewing parameters may improve accuracy of facial detection. For example, a sending WTRU may perform local facial detection with higher accuracy than may be possible at a receiving WTRU (e.g., in order to determine parameters such as user presence, user attention to the screen, and/or distance of user to screen, among other reasons). The sending WTRU may transmit one or more viewing parameters to the receiving WTRU.

One or more of the viewing parameters described herein, including those viewing parameters described and shown in FIG. 5, may be signaled via a network.

Figure 6:
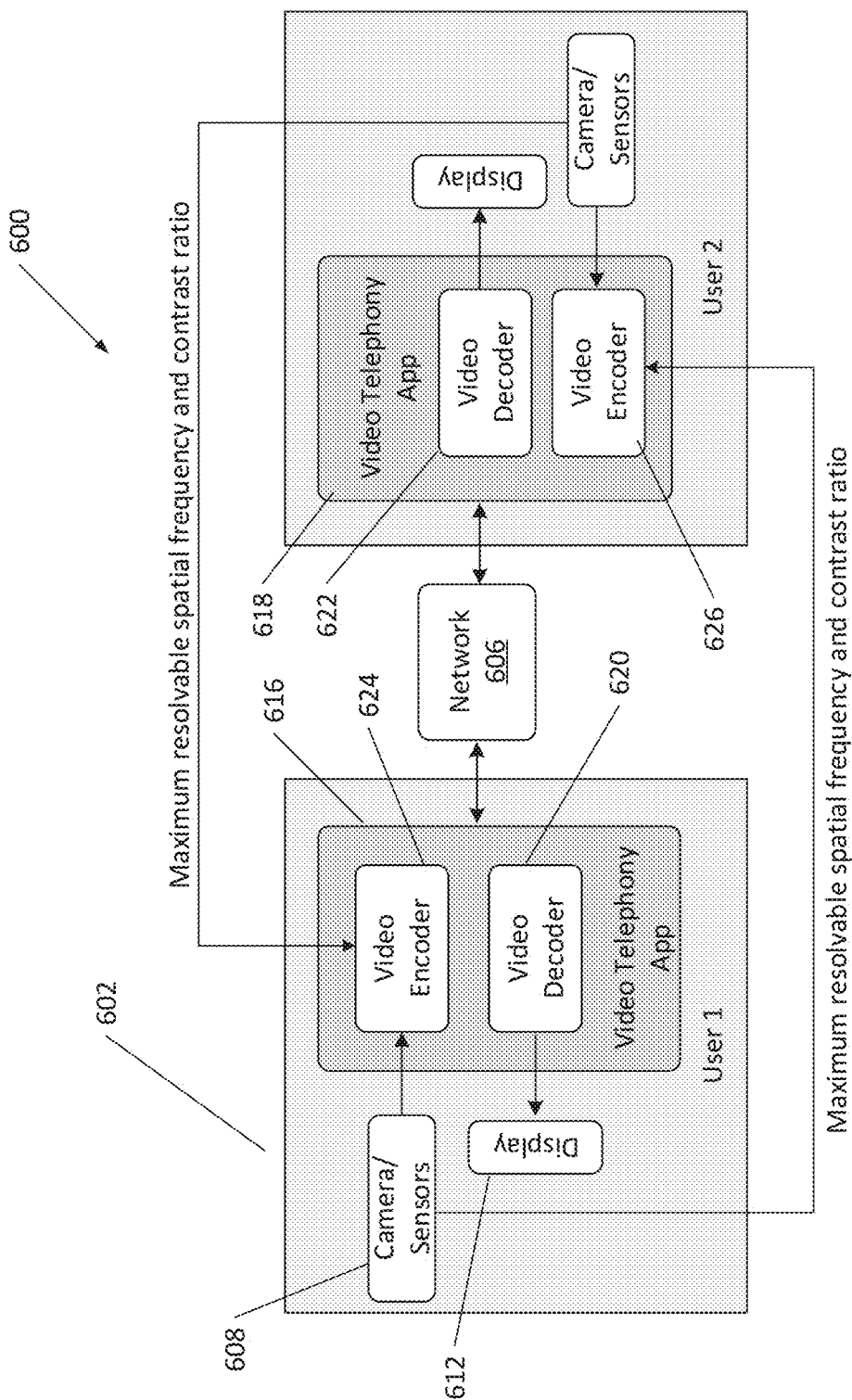
FIG. 6 is a diagram illustrating an example video telephony system comprising WTRUs in communication with one another via a network.

FIG. 6 illustrates an example video telephony system 600 comprising WTRUs 602, 604 in communication with one another via a network 606, such as the Internet. The WTRUs 602, 604 may include respective cameras/sensors 608, 610 and respective displays 612, 614. The WTRUs 602, 604 may execute respective video telephony applications 616, 618 stored in memory devices. The video telephony applications 616, 618 may include respective video decoders 620, 622 and respective video encoders 624, 626.

As shown in FIG. 6, the camera/sensor 608 of the WTRU 602 may signal viewing condition information (e.g., one or more viewing parameters) to the video encoder 626 of the WTRU 604. The camera/sensor 610 of the WTRU 604 may signal viewing condition information to the video encoder 624 of the WTRU 602. The one or more viewing parameters may include, the maximum resolvable spatial frequency information and/or perceivable contrast ratios. The one or more viewing parameters may be used in rate selection and/or perceptual pre-filtering at the remote WTRU (e.g., the encoder at the remote WTRU). The one or more viewing parameters may include compact representations. The sender WTRU may process sensor data into maximum spatial frequency and perceivable contrast ratio.

The maximum resolvable spatial frequency and/or the perceivable contrast ratio or sensor data may be communicated in-band as part of the application layer protocol, or may be included as extensions to the Session Initiation Protocol (SIP), Session Description Protocol (SDP), and/or Real-Time Control Protocol (RTCP). For example, MT Receiver Reports (RRs) may include information regarding the viewing conditions at the receiver WTRU. The signaling may be sent, for example, over the network, among other scenarios.

Figure 7:
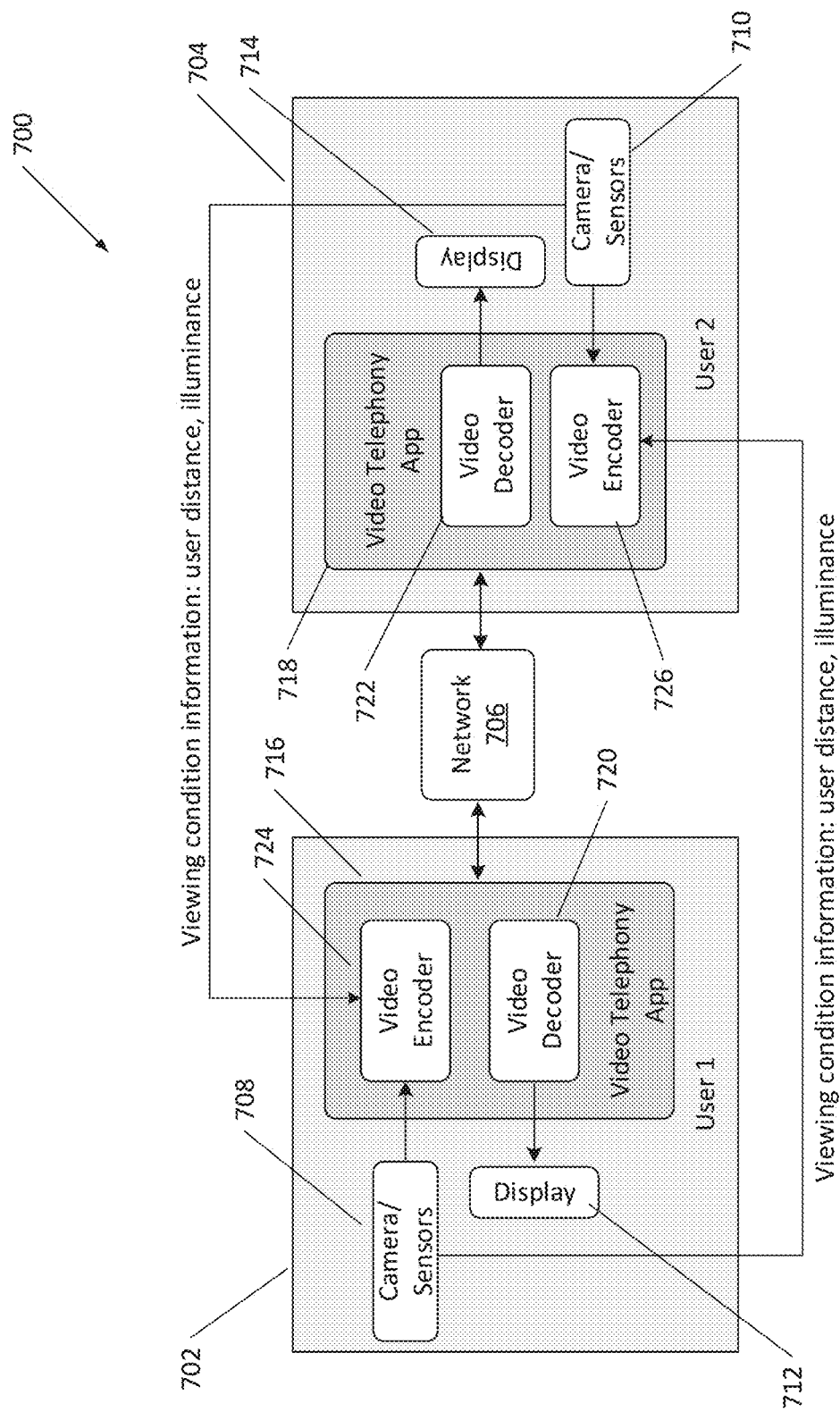
FIG. 7 is a diagram illustrating an example video telephony system comprising WTRUs in communication with one another via a network.

FIG. 7 illustrates an example video telephony system 700 comprising WTRUs 702, 704 in communication with one another via a network 706, such as the Internet. The WTRUs 702, 704 may include respective cameras/sensors 708, 710 and respective displays 712, 714 and may execute respective video telephony applications 716, 718 stored in memory devices. The video telephony applications 716, 718 may include respective video decoders 720, 722 and respective video encoders 724, 726.

The one or more viewing parameters may include camera setting information. The camera setting information may be signaled (e.g., to improve interpretation of the video data for synthesis into maximum resolvable spatial frequency and/or perceivable contrast ratio). The camera setting information may include user distance and/or illuminance. The camera setting information may be used for synthesis into maximum resolvable spatial frequency and contrast ratio at the remote WTRU (e.g., an encoder at the remote WTRU). FIG. 7 depicts an example flow of sensor information (e.g., the one or more viewing parameters) for the video telephony system 700.

The bit rate of the video encoding may be adjusted (e.g., to avoid delivering information that cannot be perceived by the end user). Bit rate selection may be driven by one or more viewing parameters, including, for example, the maximum spatial frequency that can be resolved by the receiving user, the maximum contrast ratio that is perceivable by the receiving user, and/or the attention of the receiving user. The attention of the receiving user may be based, for example, on eye tracking.

The one or more viewing parameters may include display characteristics. The display characteristics may be included in a device viewing parameter. The display characteristics may be signaled. The display characteristics may establish the limits on spatial frequency acuity. The display characteristics may include the size of the receiver's display, aspects of its maximum contrast ratio, and/or details of its maximum illuminance. The video stream may be modified based on the display resolution of the receiving WTRU (e.g., to avoid transmission of spatial frequencies that cannot be reproduced by the display of the receiving WTRU). The display characteristics may be exchanged as part of call setup using extensions to SDP. The display characteristics may be exchanged as part of the SIP protocol exchange. The display characteristics may change dynamically, for example, when the session switches from two-party to multi-party, or when there is an orientation switch from portrait to landscape or vice versa. The functional relationship between the screen tilt and the contrast ratio may be used to determine the spatial frequency acuity. The display characteristics may enable synthesis of maximum perceivable spatial frequency information at the receiver WTRU.

There may be a tradeoff between bandwidth and latency. Users (e.g., video telephony clients) individually may be able to trade between the latency and the offered load. Collectively, users may influence the tradeoff between the latency and the offered load. The offered load may be reduced by reducing the maximum spatial frequencies transmitted based on what is perceivable by a user at the receiver WTRU. The offered load may be reduced to provide a lower latency video stream. The lower latency video stream may have a larger impact on the users perceived Quality of Experience than a reduced resolution. The rate selection may be determined to balance between the latency and the offered load (e.g., by considering the impacts of both local source coding distortion and distortion due to packet loss).

Savings in power consumption at the sender may be achieved by reducing the video capture resolution and/or frame rate, lowering the video encoding resolution, and/or reducing the quality of the video encoding (e.g., using a single-pass vs. 2-pass encoding).

The visible cut-off-frequency (e.g., a spatial frequency boundary between perceptible and imperceptible details) may be determined from remote viewing conditions (e.g., using a CSF model of human visual perception). The visible cut-off-frequency may be used to control pre-filtering. Pre-filtering may remove detail that might not be visible to the viewer at the remote device. Video may be captured and/or encoded at a resolution that may be determined by the local camera with the video filtered (e.g., before encoding to remove such detail). In some embodiments, system complexity may be reduced. The resolution of the capture and/or encoding may be reduced based on the cut-off-frequency (e.g., such that the lower resolution may still represent the amount of detail that may be visible to the viewer at the remote device).

For example, when the cut-off-frequency, f, is less than ½, the image may be reduced in resolution by a factor of ½. The cut-off-frequency, f, may be expressed in the units of the original resolution. For example, if f is ⅙, the resolution may be reduced by a factor of 3. A resolution downscaling factor may be selected at a power of 2. As an example, if the cut-off-frequency is less than ¼ the resolution of capture and/or encoding may be reduced by a factor of 2. The cut-off-frequency may be expressed in the reduced (e.g., updated) resolution. Filtering (e.g., applying a pre-filter) may remove additional detail with the modified cut-off-frequency.

Figure 8:
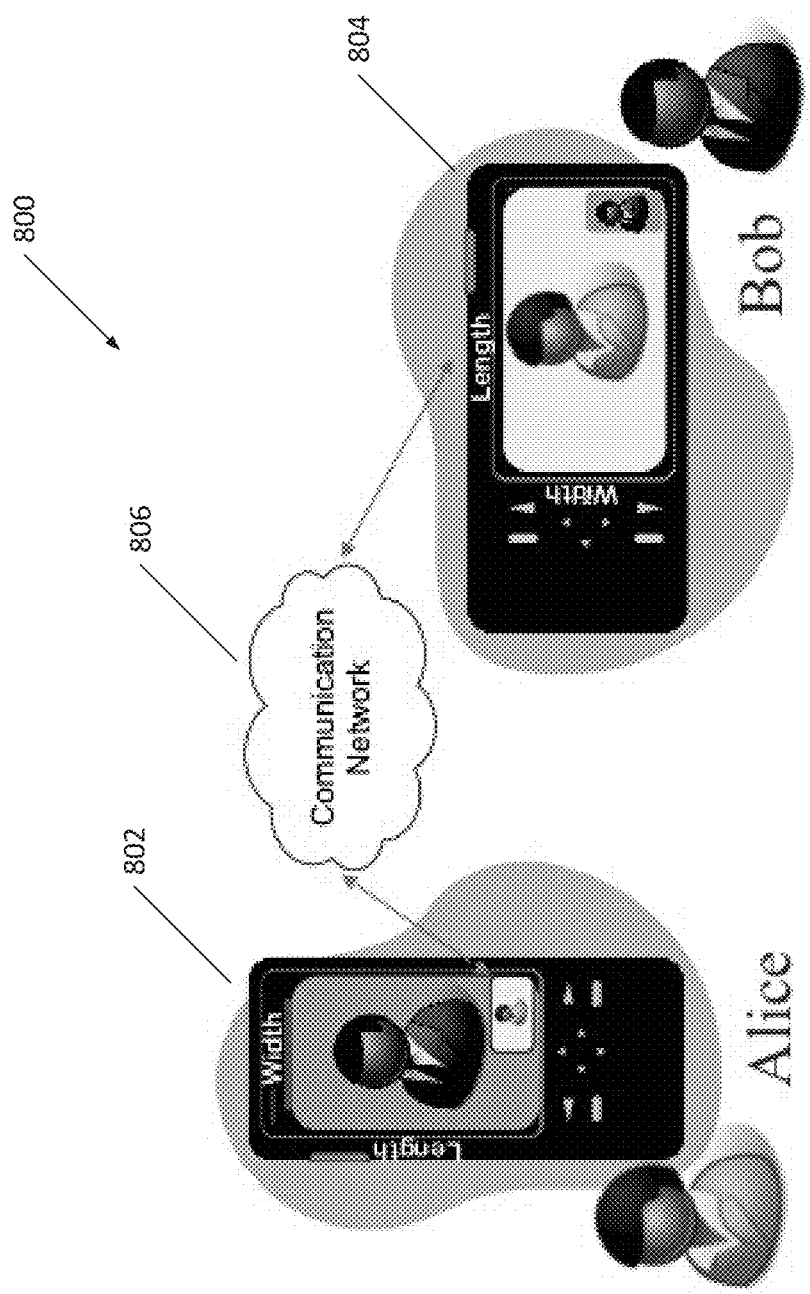
FIG. 8 is a diagram illustrating an example video telephony system comprising WTRUs in communication with one another via a network, with video capturing of one WTRU based on an orientation of another WTRU.

The screen (e.g., the display) may be partitioned such that the remote user may see multiple participants. For example, the display may be partitioned when more than two users participate in a video telephony session. The spatial resolution of the outgoing video may be reduced based on knowledge of the partitioned receiver display (e.g., to achieve substantial network resource savings). The consumption of network resources may be reduced by considering the smaller portion of the display in computing the maximum spatial frequency that may be perceived as well as the contrast ratio and reduction in display luminous emittance. Devices (e.g., WTRUs) in a video telephony session may exchange information about their respective orientations. The image (e.g., video and/or picture) capturing and/or processing may be adapted (e.g., modified) according to the orientation of the remote device (e.g., so that the user experience of the displayed video and picture may be optimized). Video capturing and/or video processing may be adapted (e.g., modified) to the display orientation of a remote device (e.g., a WTRU that is receiving the video that is being captured and/or processed). FIG. 8 depicts an example video telephony system 800 in which WTRUs 802, 804 are in communication with one another via a communication network 806, such as the Internet. In the video telephony system 800 of FIG. 8, local video capturing may be based on the orientation of the remote device. For example, video capturing at WTRU 802 may be based on the orientation of WTRU 804, and video capturing at WTRU 804 may be based on the orientation of WTRU 802. By basing local video capturing on the orientation of the remote device, the issues illustrated in FIGS. 3 and 4 may be reduced or eliminated.

Figure 9A:
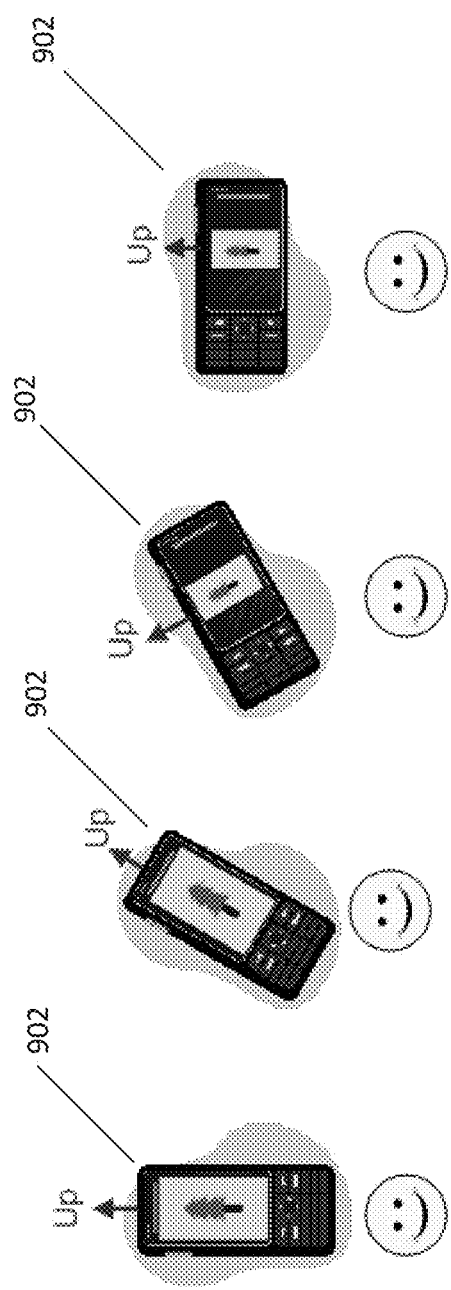
FIGS. 9A-9D are diagrams illustrating examples of showing video at a receiving WTRU for a given orientation of the display of a WTRU relative to the observer.
Figure 9B:
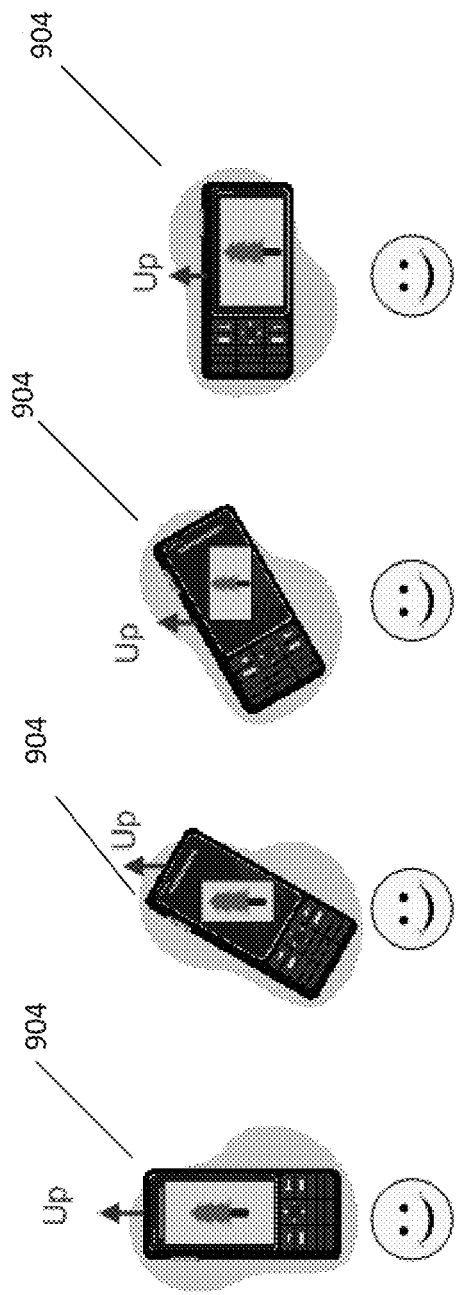
Figure 9C:
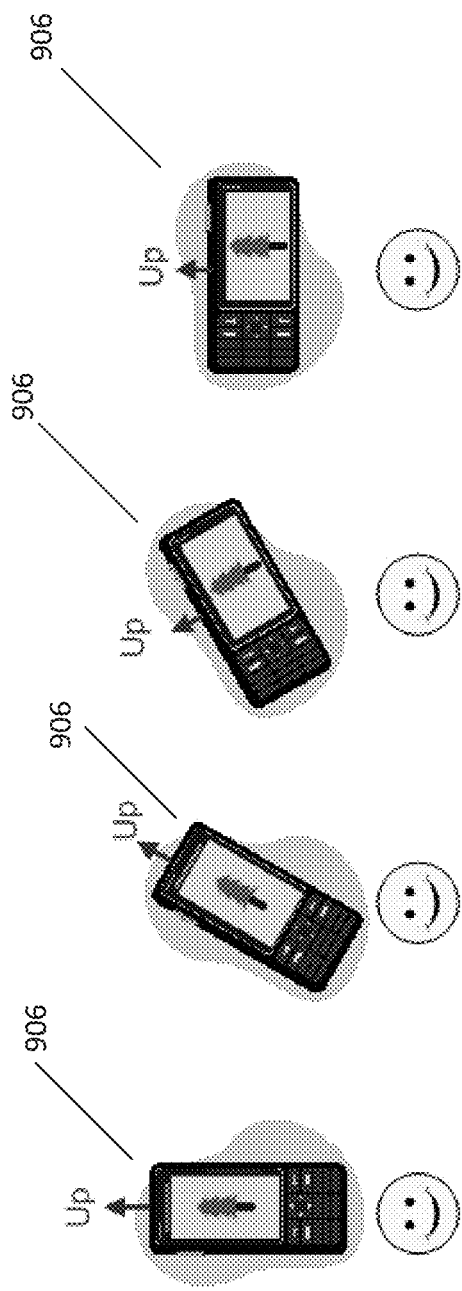
Figure 9D:
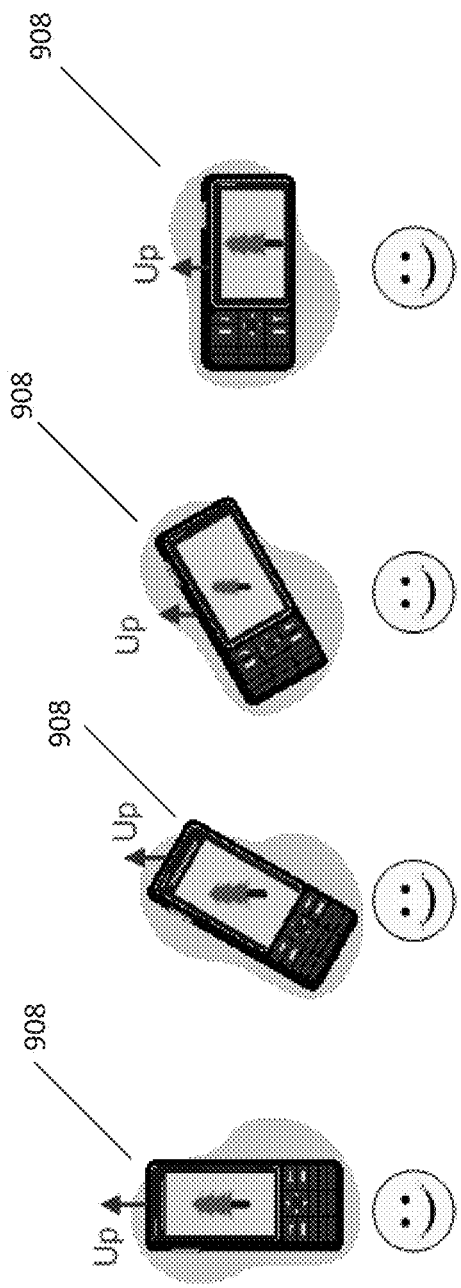

For a given orientation of the display of a device (e.g., a WTRU) relative to an observer, there may be several desired ways to display the video at the receiving device (e.g., a receiving WTRU), as shown in FIGS. 9A-9D. For example, FIG. 9A illustrates a receiving WTRU 902 displaying a video using as much of the display (e.g., screen) as possible, with the up direction along the length or the width of the screen. FIG. 9B illustrates a receiving WTRU 904 displaying a video using as much of the screen as possible and, with the up direction determined (e.g., uniquely determined) by the eyes of the receiving WTRU 904 user (e.g., regardless of the orientation of the receiving WTRU). FIG. 9C illustrates a receiving WTRU 906 displaying a video using the entire screen, with the up direction either along the length or the width of the screen. FIG. 9D illustrates a receiving WTRU 908 displaying a video using the entire screen, with the up direction determined (e.g., uniquely determined) by the eyes of the receiving WTRU 908 user (e.g., regardless of the orientation of the receiving WTRU).

Video stream modifications (e.g., adaptations) may be performed at the sending device (e.g., at the sender side). Video stream modifications may include one or more of the following: cropping, downsizing, down sampling, zooming, or adaptive video capturing. FIGS. 10A-10B illustrate an example of sender-side cropping. The sender-side WTRU may capture the video and may crop the video based on one or more viewing parameters of the receiver WTRU 1002, 1004 (e.g., according to the video format that is the best for a receiver-side WTRU 1002 or 1004). The sender-side WTRU may encode the cropped video, as shown in FIGS. 10A-10B. As shown in FIG. 10B, the sides of the cropped region may not be parallel to nor perpendicular to the sides of the captured picture (e.g., of the video).

Figure 11A:
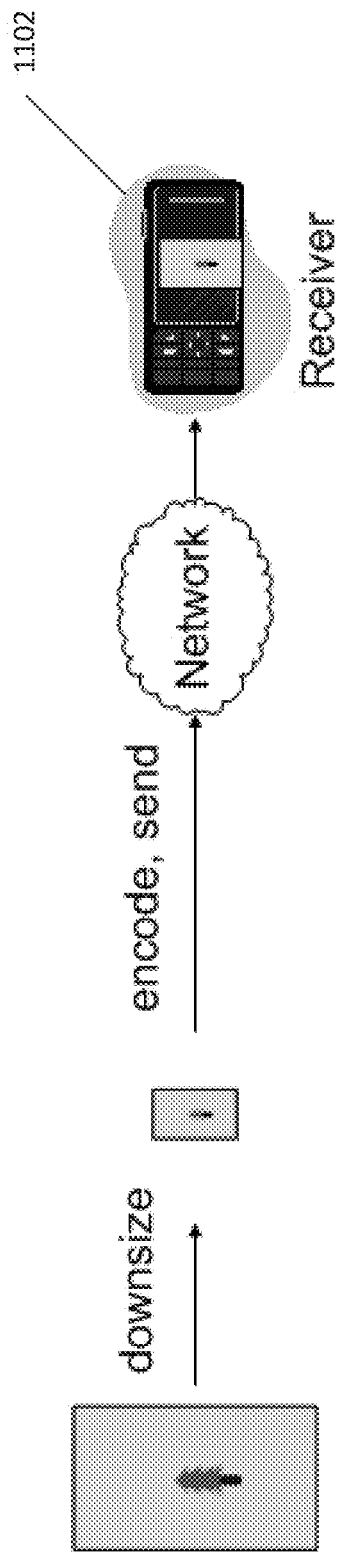
FIGS. 11A-11B are diagrams illustrating an example of sender-side downsizing or down sampling.
Figure 11B:
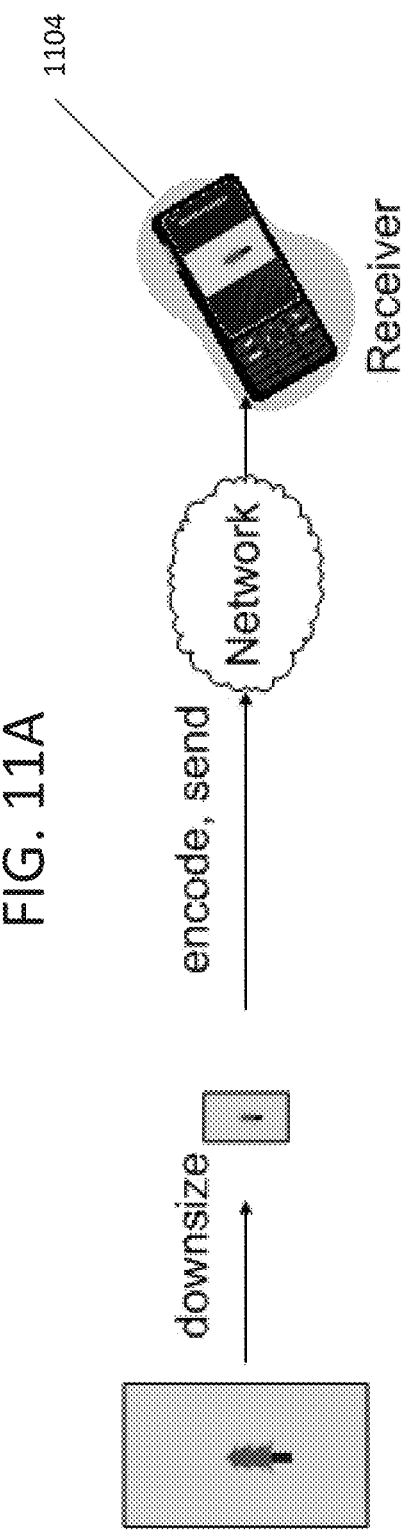

FIGS. 11A-11B illustrate an example of sender-side downsizing or down sampling. Video capturing may be based on the display orientation of a sender-side WTRU. Based on the orientation of the receiver WTRU, the captured pictures (e.g., of the video) may be modified (e.g., downsized or down sampled) to fit the display of a receiver-side WTRU 1102 or 1104.

Figure 12A:
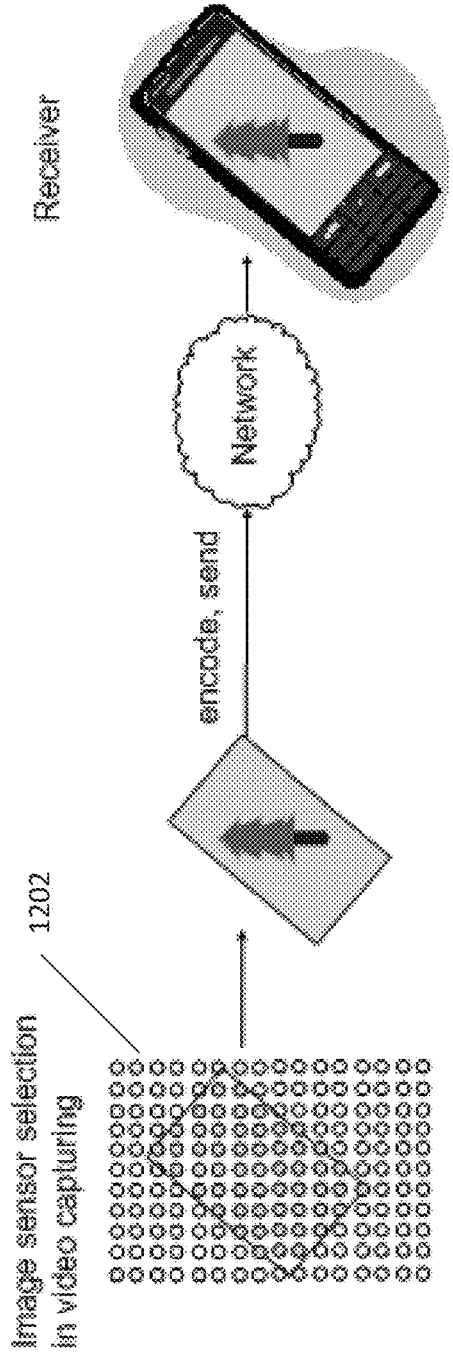
FIGS. 12A-12B are diagrams illustrating an example of image sensor selection.
Figure 12B:
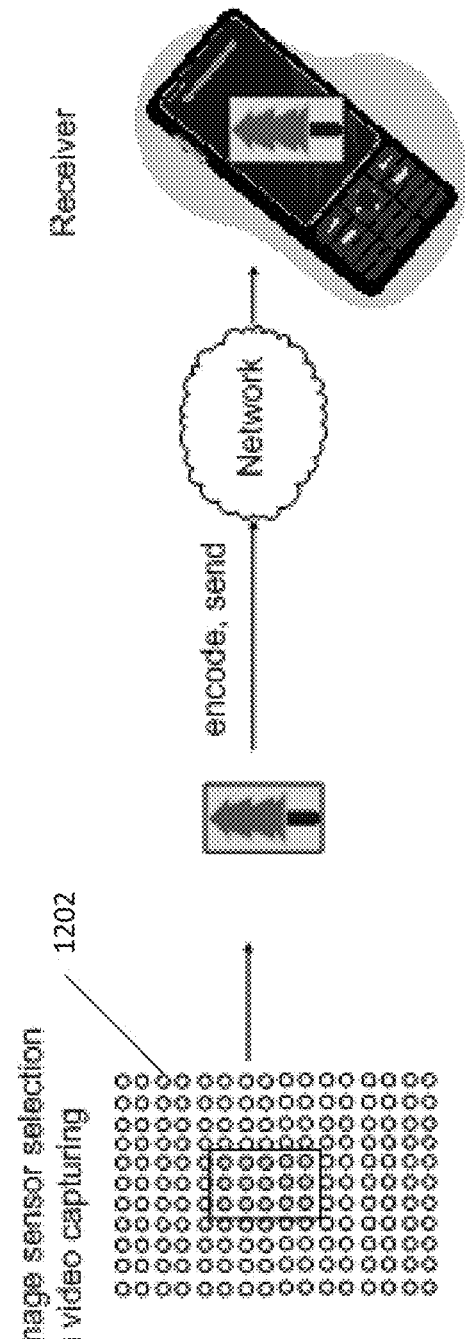

A device may employ adaptive video capturing. A subset (e.g., a proper subset) of the image sensors may generate (e.g., be selected to generate) the pictures (e.g., the video) for video capturing. The subset may be determined based on the orientation of the receiver WTRU (e.g., the display of the receiver WTRU). The pictures may have the same resolution as the resolution of the display of the receiver WTRU. The resolution of the image sensor array may be higher than the resolution (e.g., the video resolution) at the display of the receiver WTRU. The subset of image sensors may be selected based on the resolution of the receiver WTRU (e.g., the display of the receiver WTRU). FIGS. 12A-12B illustrate an example of image sensor selection.

For example, the sender-side WTRU may have an electronically controlled variable focal length lens (e.g., a digitally controlled mechanical zoom). FIG. 12A depicts a subset of the pixels in an image sensor 1202 being utilized. The subset of the pixels may be satisfactory if the user is satisfied with the Field of View (FOV) and the display resolution approximately matches the image capture resolution. Electronically adjusting the focal length of the lens (e.g., by zooming out to use more image sensors) may utilize (e.g., fully utilize) the image sensor resolution and may maintain the same FOV (e.g., if the display has more pixels than the subset of image sensor pixels), as shown in FIG. 12B.

Far end (e.g., remote) camera control may be utilized (e.g., if a WTRU is conferencing with a traditional video conferencing client) to adjust the far end camera. The far end camera may be adjusted (e.g., adjusted as appropriate) for the mobile display.

Figure 13:
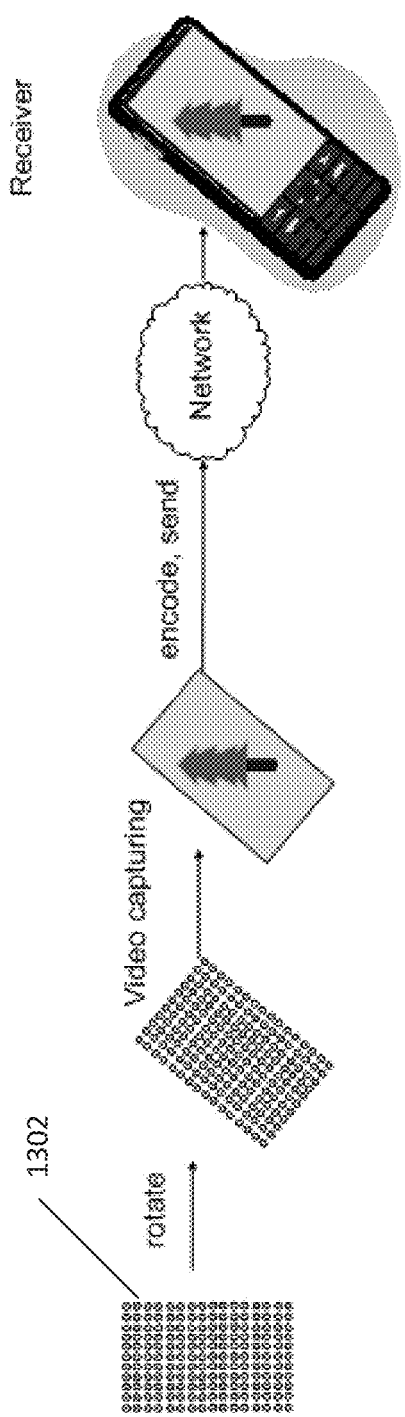
FIG. 13 is a diagram illustrating an example of image sensor army rotation.

FIG. 13 illustrates an example in which an image sensor array 1302 may be rotated. The image sensor array 1302 may be rotated (e.g., via electrical mechanical devices) to match the orientation of the receiver (e.g., the display of the receiver). The image sensor array 1302 may be rotated, for example, to utilize each image sensor in the video capturing process. Rotation of the image sensor array 1302 may yield the highest possible resolution of the video when there is sufficient bandwidth in the communication network.

Figure 14:
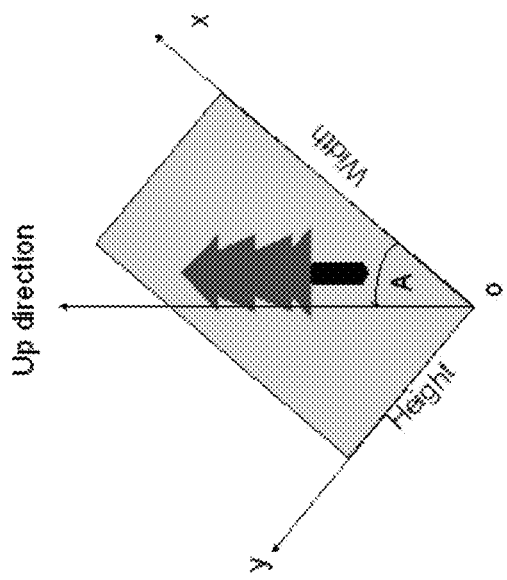
FIG. 14 is a diagram illustrating an example up direction to a width for a video picture.

A WTRU (e.g., the video receiver) may send orientation information to another WTRU (e.g., the video sender). The orientation information may include, but not limited to, the height and width of the desired video pictures and/or the up direction relative to the video picture. For example, the up direction may be an angle A relative to the width, as shown in FIG. 14. The orientation information may specify an angular orientation of the picture. For example, the direction might not encode (e.g., explicitly encode) the "up" direction. The direction may encode a "down" direction, a "left" direction, and/or any other known orienting direction relative to the picture. "Up direction" may establish an orientation of a video picture and/or of a device display.

A device (e.g., the video sender) may determine its own up direction (e.g., after receiving the orientation information). The device may determine the picture that it needs to capture. For example, the width may be in the direction −A, and the height may be in the direction (90−A)°. The device may receive a height and width of the desired video pictures. The device may determine how many pixels may be in the width direction and/or the height direction based on the received width and height from the video receiver.

The video receiver may determine the width and height and/or up direction by measuring the location of the eyes relative to the display.

Figure 15:
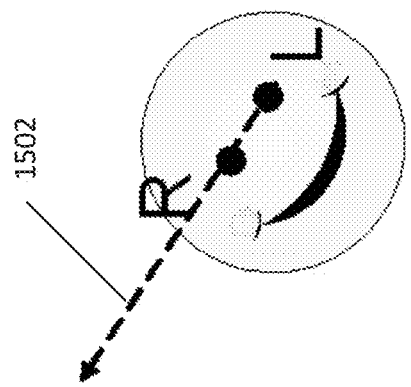
FIG. 15 is a diagram illustrating an example eye-axis of a user.

The video receiver may detect the direction of an eye-axis 1502 of the user, as shown in FIG. 15. For example, the video receiver may analyze video captured using a front camera of the device. The video receiver may detect a face and/or detect eye positions in the captured video. The video receiver may determine the direction of the eye-axis 1502 based on the eye positions.

Figure 16:
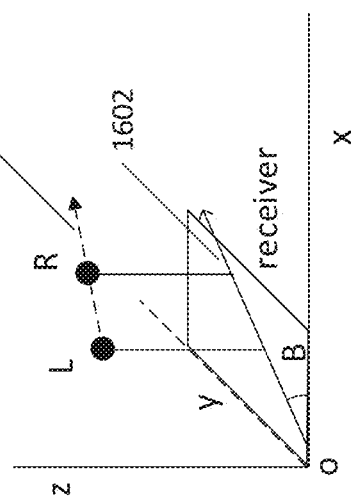
FIG. 16 is a diagram illustrating an example projection of an eye-axis onto a display plane.

The video receiver may determine the up direction for the video to be displayed. The video receiver may project the eye-axis 1502 of the user onto a display plane. FIG. 16 illustrates a projection 1602 of the eye-axis 1502 onto the display plane. If the angle of this projection 1602 relative to the x-axis is B°, the up direction of the video to be displayed may be determined, for example, either as (B+90)° or as a function f((B+90)°). The function f may be a quantization function that may be defined, for example, as follows:

$$f(z) = \begin{cases} 0°, & -45° < z \le 45° \\ 90°, & 45° < z \le 135° \\ 180°, & 135° < z \le 225° \\ 270°, & 225° < z \le 315° \end{cases}$$

The up direction of the video may be determined as (B+90)°. For example, if the up direction is uniquely determined by the eyes, regardless of the orientation of the receiver, the up direction may be determined as (B+90)°, as shown in FIGS. 9B and 9D. The up direction of the video may be determined using a quantization function. For example, the up direction may be determined using a quantization function if the up direction is either along the length or the width of the screen, as shown in FIGS. 9A and 9C. Determination of the "up" direction may be based, for example in part, on orientation sensors that may be present in the receiver device. For example, orientation sensor readings may supplement eye-axis tracking (e.g., during periods where the eye tracking algorithm might not reliably determine eye positions).

Figure 17:
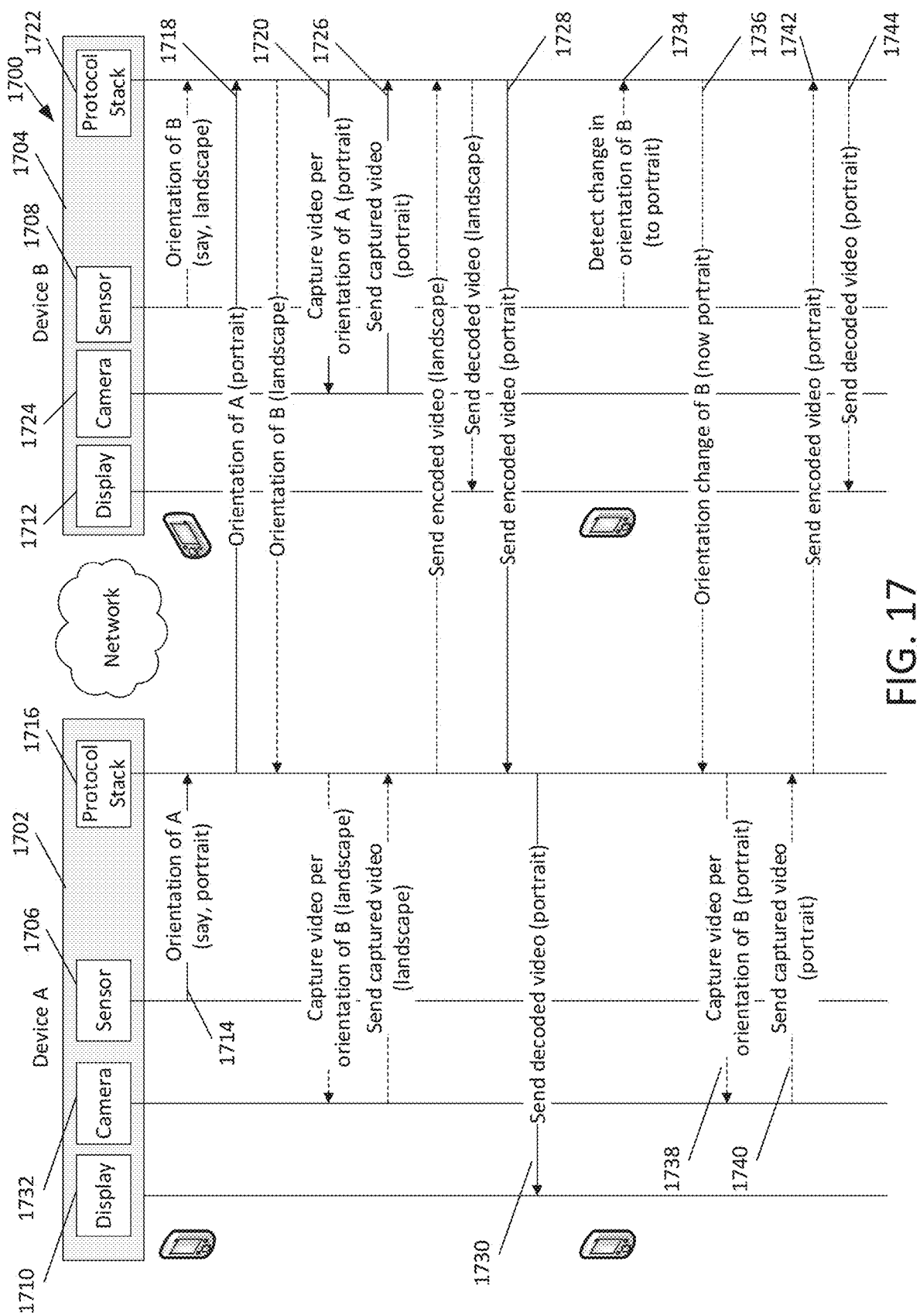
FIG. 17 is a diagram illustrating an example call flow for capturing video locally according to an orientation of a remote device.

FIG. 17 illustrates an example call flow 1700 for capturing video locally according to the orientation of a remote device. The orientation of the remote device may be used to control the local video capturing (e.g., video capturing at a local device). WTRUs 1702, 1704 may include respective sensors 1706, 1708 for detecting the respective orientations of WTRUs 1702, 1704. The sensors 1706, 1708 may sense, for example, gravity and/or acceleration.

The orientation of the remote device may be between a portrait orientation and a landscape orientation. For example, the orientation may have three degrees of freedom in a three-dimensional space. The sensor 1706 or 1708 may estimate the orientation of the WTRU 1702, 1704. The estimate may be used to determine which display format (e.g., portrait or landscape) is best given the orientation (e.g., actual orientation) of a display 1710, 1712. The orientation may be a binary classification, e.g., the orientation of a display may be classified as either portrait or landscape even though the actual orientation of the display is somewhere between portrait (e.g., purely portrait) and landscape (e.g., purely landscape). Detection of the orientation of the display by the sensor may use the outcome of this binary classification.

At 1714, if at time $t_0$, the orientation of WTRU 1702 is portrait and the orientation of WTRU 1704 is landscape, the sensor 1706 of WTRU 1702 may detect the portrait orientation and may send the information to a protocol stack 1716 of WTRU 1702. At 1718, the information about the orientation of WTRU 1702 may be sent to WTRU 1704. At 1720, a protocol stack 1722 of WTRU 1704 may inform a camera

1724 of WTRU 1704 of the orientation of WTRU 1702. At 1726, the camera 1724 may capture video according to the orientation of WTRU 1702 (e.g., portrait), and may send the video to the protocol stack 1722. At 1728, the protocol stack 1722 may send the encoded video in the orientation of WTRU 1702 (e.g., portrait), to the protocol stack 1716 of WTRU 1702. At 1730, the protocol stack 1716 of WTRU 1702 may decode the video and may send the decoded video to the display 1710 of WTRU 1702. The decoded video may agree with the orientation of WTRU 1702.

As shown in FIG. 17, similar processes may be performed, with the roles of WTRUs 1702, 1704 reversed, for detecting the orientation of WTRU 1704, e.g., landscape, and using the detected orientation of WTRU 1704 to control the capture of video by a camera 1732 of WTRU 1702.

At 1734, if at time $t_1$, the orientation of WTRU 1704 has changed from landscape to portrait, the sensor 1708 may detect the change in orientation and may inform the protocol stack 1722 of WTRU 1704 of the change in orientation. The protocol stack 1722 may inform the WTRU 1702 of the change in orientation at 1736. At 1738, the protocol stack 1716 of WTRU 1702 may inform the camera 1732 of WTRU 1702 of the change. At 1740, the camera 1732 may send the captured video, which may be in portrait format, to the protocol stack 1716 of WTRU 1702. At 1742, WTRU 1702 may send the video (e.g., with the new portrait format) to WTRU 1704. At 1744, the protocol stack 1722 of WTRU 1704 may decode and send the video, in portrait format, to the display 1712 of WTRU 1704. The decoded video may agree with the orientation (e.g., the new portrait orientation) of WTRU 1704.

The camera may capture video according to its local orientation and may crop the captured video according to an orientation of a remote device. The cropping may take place at a preset region of the captured video. The cropping may cover the region of interest, e.g., a human.

Adaptation to viewing conditions may be performed in multi-party video conferencing, e.g., using a single camera with multiple participants. In an embodiment, the adaptation to viewing conditions may be determined by the closest user to the display or by the user with the most stringent requirements. In an embodiment, the adaptation to viewing conditions may be determined based on the closest attentive user. The adaptation to viewing conditions may be determined based on a subset of users (e.g., users who are paying attention to the video). For example, if there is a user who is close to the display but is not viewing the display as determined by face detection logic, adaptation may be determined based on the next closest user who is determined to be viewing the display.

In multi-party video conferencing, different bit rates may be allocated to different participants. Relative priority may be assigned statically. For example, the CEO always gets the most bandwidth in a business conferencing application. Relative priority may be assigned dynamically (e.g., based on an activity or lack of activity, such as speaking or not speaking). A speaking participant may be allocated more bandwidth (e.g., more video bandwidth) than a non-speaking participant. A point of attention of one or more receivers (e.g., receiver devices) may be used to allocate bandwidth. Speech activity may be used to determine bandwidth priority. An active speaker may be selected and routed to the others (e.g., by a control bridge). Hard switching may be replaced with user adaptive options based on, for example, voice activity or other criteria.

For example, one or more devices (e.g., users) may transmit video to the MCU. An MCU may select video from at least one device (e.g., a few devices) to broadcast. The MCU may broadcast a mix of the video from the selected devices into a single screen. The devices may be selected based on voice activity detection, for example. The MCU may influence the one or more transmitting devices such that the video sent from the selected device (or the selected few devices) may be sent to the MCU at a higher quality (e.g., a higher bit rate or higher resolution) than the other transmitting devices. The MCU may influence the encoding of the one or more transmitting devices using signaling (e.g., a message requesting the sender to change its sending bit rate). The MCU may indicate (e.g., signal) a hit rate for the one or more transmitting devices. The MCU may influence the bit rate of the one or more transmitting devices using traffic shaping techniques and/or feedback "tricking" techniques (e.g., setting artificial conditions and/or values, perhaps in feedback sent to a client).

Video available from one or more, or all, devices may enable lower latency switching. The MCU may select at least one video stream (e.g., the video stream from the current speaker) for broadcast to one or more (e.g., all) devices. The device of the selected video stream (e.g., the current speaker) may receive a video stream from another device (e.g., a previous speaker). The MCU may form a composite image of one or more devices which may be broadcast to one or more devices (e.g., conference participants). The MCU may send (e.g., forward) one or more selected video streams (layers may be scalably coded) to one or more (e.g., each) client. The client may arrange the sent video streams for display locally. One or more (e.g., all) video streams may be sent to one or more (e.g., all) devices. The one or more devices configures the display locally based on the received video streams. The video stream from the device of the current speaker may be sent to other devices, perhaps for example while video from a different device may be sent to the device of the current speaker.

Detection of user gaze may be used to control rate allocation within different portions of a frame. The region within a frame at which an individual is looking may be localized to improve the quality in that region. For example, the viewer may be focused on the middle of the screen when he or she is attentive.

Figure 18:
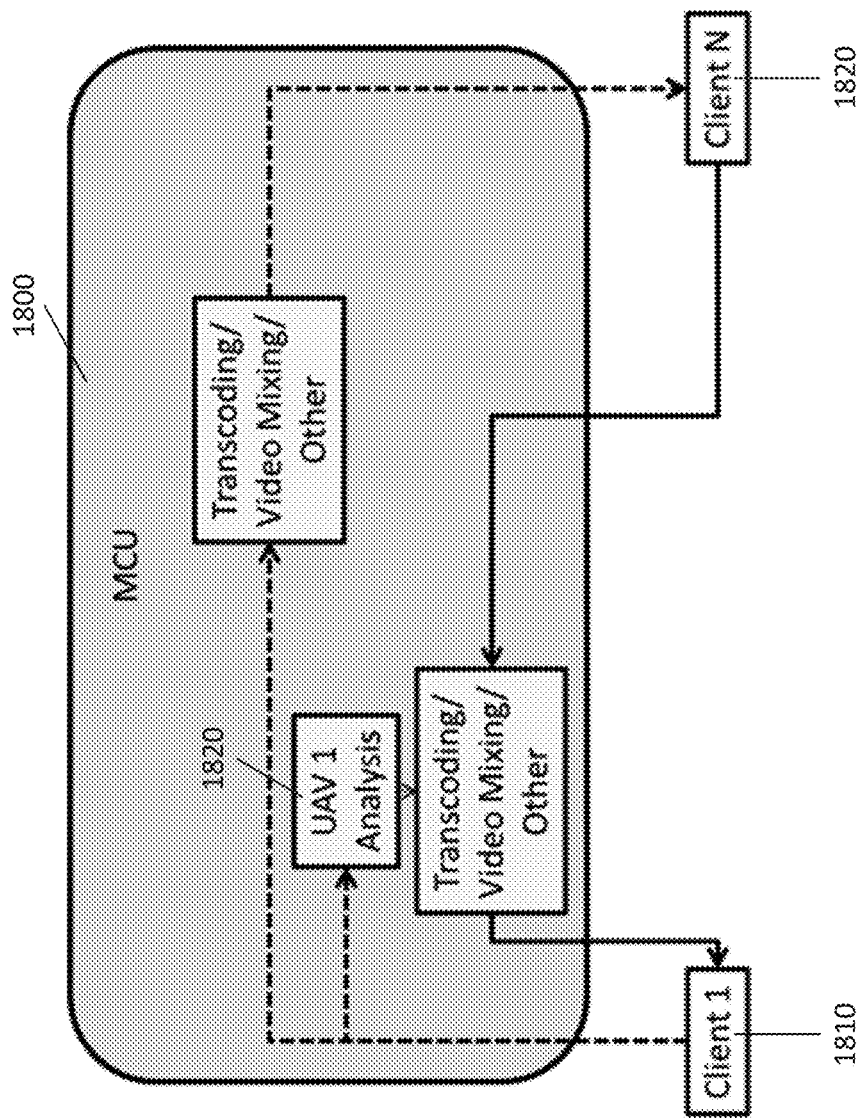
FIG. 18 is a diagram illustrating an example User Adaptive Video (UAV) in a Multipoint Control Unit (MCU) setting.

The MCU may include user adaptive video functionality. The MCU may monitor the video streams that may be produced by one or more, or each, endpoint (e.g., device). FIG. 18 shows an example of UAV processing being applied in an MCU 1800 for a single connection. The video stream from Client 1 1810 may be analyzed by the UAV-1 Analysis module 1820 of the MCU 1800 (e.g., to estimate viewing conditions for Client 1 1810). The analysis may be used to determine a viewing parameter (e.g., a viewing condition) associated with Client 1 1810. Analyzing the video stream to determine a viewing parameter may include analyzing video packet data, video hit stream data, side information and/or control signaling associated with the video stream. Control signaling may be conveyed, for example, using SIP messages, H.245 messages, HTTP requests/responses, and/or the like. The viewing parameter may be used to control the video processing transcoding and/or video mixing process of the video sent to Client 1 1810. The UAV may be used for more than a single link, or for all connections in the MCU. The MCU may determine one or more viewing parameters for one or more, or each, endpoint.

The MCU may determine as many viewing parameters as possible from the video stream (e.g., without requiring additional signaling). Viewing parameters (e.g., viewing parameters which may be relatively more useful than other viewing parameters) may include viewing distance, scaled by display size, and/or ambient lighting level, among others. Other viewing parameters (e.g., viewing parameters which may be derived from analysis of the video) may include user presence, user attentiveness, and/or motion of the display relative to the user, among others. Any of these parameters or any combinations thereof may be used for adapting video sent by the MCU to a device. One or more viewing parameters may be determined by face detection applied to the video stream received from the device. When no face is detected, a viewing parameter may include a conservative viewing distance. A conservative distance may be as small a distance as might be practically used (e.g., a smallest practical distance to view a device of a specific type). At farther distances UAV may be more aggressive in removing detail, so a conservative distance may be chosen, for example to preserve more detail, among other reasons. A common "close" viewing distance of 3 picture heights of the display may be used for the conservative distance. Expressing the distance in units of picture height scales with display size and may be consistent with the distance use in UAV.

The viewing distance may be determined based on a situation where the camera may be located at the same distance from the user as the display. The MCU may analyze the video (e.g., a video stream) from a sender (e.g., a sender device) to determine the user-to-camera distance. The MCU may determine user-to-display distance based on the user-to-camera distance. Determination of user-to-camera distance from the analyzed video may be based on face detection. Determination of user-to-camera distance may utilize knowledge of the camera setup on the sender device. For example, the MCU may identify a sender's device type (e.g., manufacturer, model, or other device identifier) using signaling or user profile information. The MCU may identify a software video-telephony client in use by the sender. The software video-telephony client may configure the camera, and/or may be known to perform image resizing/rescaling in a particular way. Signaling between the sender device and the MCU may include identifiers for the sender device and/or the video-telephony client software. For example a "User Agent" field or another similar field may identify the manufacturer, the model number, the device type, and/or the software client. The MCU may retrieve device viewing parameters of the camera setup which may correspond to the sending device and/or the software client from a database. The device viewing parameters may be based on identification of the sender device and/or the video-telephony software client, among other factors. The device viewing parameters (e.g., properties of the sender device camera and/or the typical camera configuration or scaling used by the sender software client) may be used together with face detection, perhaps for example to determine the user-to-camera distance and/or the user-to-display distance, among other determinations.

One or more viewing conditions (e.g., viewing parameters) may be determined and/or estimated for at least one endpoint (e.g., device). The video sent from the MCU may be modified (e.g., to remove visually redundant information). The video sent from the MCU may be modified based on the viewing conditions estimated for the endpoint (e.g., from analysis of video sent from that endpoint to the MCU), among other factors. The MCU may include direct transcoding techniques and/or indirect traffic shaping techniques.

Device types and/or calling scenarios may be used to estimate the user-to-display distance. As an example, at least three usage modes can be considered for illustration: a conference room, an individual fixed device (e.g., PC), and an individual handheld device. The conference room mode may include at least one preferred distance. The preferred distance may be based on typical camera-to-user distance used in conference rooms. The preferred distance may be based on a specific conference room setup. The conference room usage mode may be determined by detecting a number of faces in an image (e.g., multiple faces may suggest a conference room scenario). The MCU may track (e.g., detect) zooming operations (e.g., as a conference room video conferencing system may support camera zoom). The MCU may detect zooming operations by analyzing changes in the background details present in the image (e.g., the video image). A "typical" or "normal" viewing distance for an office PC may be used, for example perhaps if the conditions suggest an individual fixed device (e.g., a single face detected, little or no camera motion). The viewing distance may be estimated based on the relative size of a face in the image, for example perhaps if the conditions suggest a handheld device (e.g., single face detected, camera motion due to non-stationary device. The instability of a scene may be used to infer a handheld device is in use (e.g., perhaps rather than a fixed camera as with a conference room or PC and web cam). The usage mode may be determined based on a codec description during call setup. The codec description may enable low (e.g., extremely low) complexity implementation (e.g., when combined with traffic shaping discussed herein).

The MCU may be in the cloud (e.g., the Internet). The MCU may be replaced by a device (e.g., a more generic device) that may perform the functions of an MCU such as call management and/or transcoding, and other functions that an MCU might not do. There may be no limitation on the clients, which may be running WebRTC or other video-telephony software.

A device may control a video communication via transcoding. The device may include a multipoint control unit (MCU). The MCU may modify a video stream from one participant based on the view parameter(s) associated with the other participants. For example, the device may receive a first video stream from a first device and a second video stream from a second device. The device may receive a third video stream from a third device. The device may receive a fourth video stream from the second device. The device may analyze the first video stream to determine a first viewing parameter associated with the first device. The device may analyze the second video stream to determine a second viewing parameter associated with the second device. The device may analyze the third video stream to determine a third viewing parameter associated with the third device. The viewing parameter may include a user viewing parameter, a device viewing parameter, and/or a content viewing parameter. The device may modify the second video stream based on the first viewing parameter and/or the third viewing parameter. The device may modify the first video stream based on the third viewing parameter and/or the second viewing parameter. The device may modify the fourth video stream based on the third viewing parameter. Modifying the video stream may include re-encoding the video stream, adjusting an orientation, removing a video detail, filtering, and/or adjusting a bit rate. The device may send the modified second video stream to the first device and/or the third device. The device may send the modified first video stream to the second device. The device may send the modified fourth video stream to the first device and/or the third device. The device may compare bit rates associated with the first viewing parameter and the third viewing parameter. The device may compare bit rates associated with one or more viewing parameters at predetermined time intervals. The device may compare bit rates associated with one or more viewing parameters continuously. The device may compare bit rates associated with one or more viewing parameters when prompted. The device may modify one or more video streams based on the viewing parameter corresponding to a most stringent quality requirement. The most stringent quality requirement may be determined based on the one or more viewing parameters. For example, when the third viewing parameter is associated with a higher bit rate than the first viewing parameter, the device may modify the fourth video stream based on the third viewing parameter.

Viewing conditions (e.g., distance information and/or ambient illumination) may be used to adjust (e.g., reduce) the hit rate of a video stream(s) produced by the MCU. The viewing conditions may include one or more viewing parameters. The MCU may employ an active transcoding and/or encoding solution (e.g., for rate adaptation and/or continuous presence functionality, among other scenarios). UAV via MCU transcoding may support a number of N (e.g., an integer value) clients in a call. N may be greater than two. The MCU may analyze the video it receives from one or more, or each, client (e.g., to determine user adaptive viewing parameters for the client, among other reasons). The MCU may modify a video stream based on one or more of the determined viewing parameters. The determined viewing parameters may also be referred to as user adaptive viewing conditions.

Figure 19A:
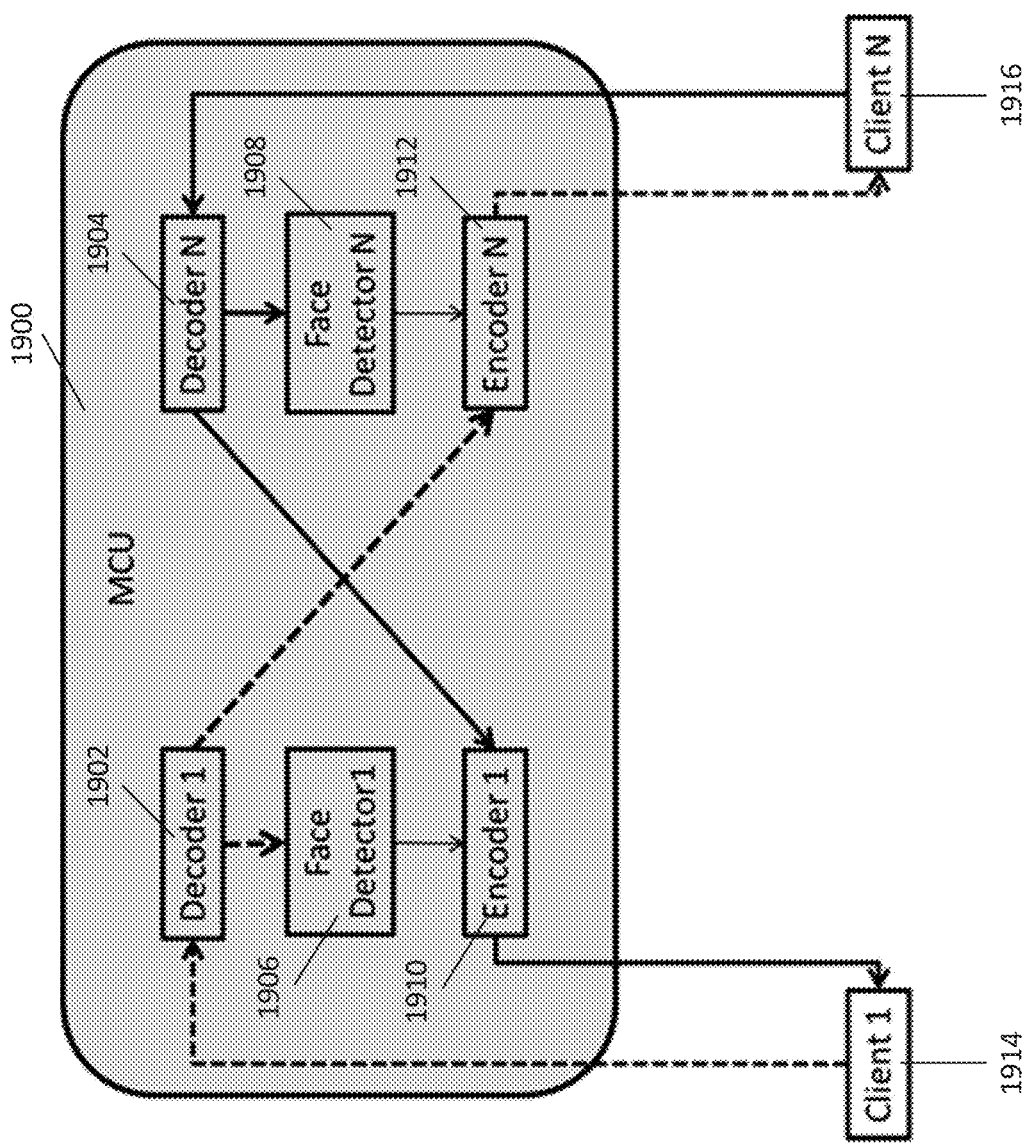
FIG. 19A is a diagram illustrating an example of an MCU implementing UAV with an encoder per client endpoint for multiple clients.

UAV viewing parameters may include face detection to determine user-to-display distance. FIG. 19A illustrates an example MCU 1900 with a decoder 1902, 1904; a face detector 1906, 1908; and an encoder 1910, 1912 for each client 1914, 1916 (e.g., device). The encoder 1910, 1912 may be controlled by a face detector 1906, 1908. The face detector 1906, 1908 may detect the video received from a device (e.g., the client 1914, 1916). The face detector 1906, 1908 may control the encoder 1910, 1912 when a separate encoder is used for one or more, or each, device, such as illustrated in FIG. 19A. For example, viewing parameters such as viewing distance, user presence, user attentiveness, ambient illuminance, etc., may be derived from the received, decoded video stream. The encoder 1910, 1912 may receive one or more viewing parameters from a device. The encoder 1910, 1912 may encode video based on the one or more viewing parameters. The encoder 1910, 1912 may send the encoded video to the device. The encoder 1910, 1912 may remove details (e.g., details which are not likely to be perceptible to a user of the device) from the encoded video. The encoder 1910, 1912 may adjust (e.g., reduce) the bit rate of the video stream transmitted to the device.

Figure 19B:
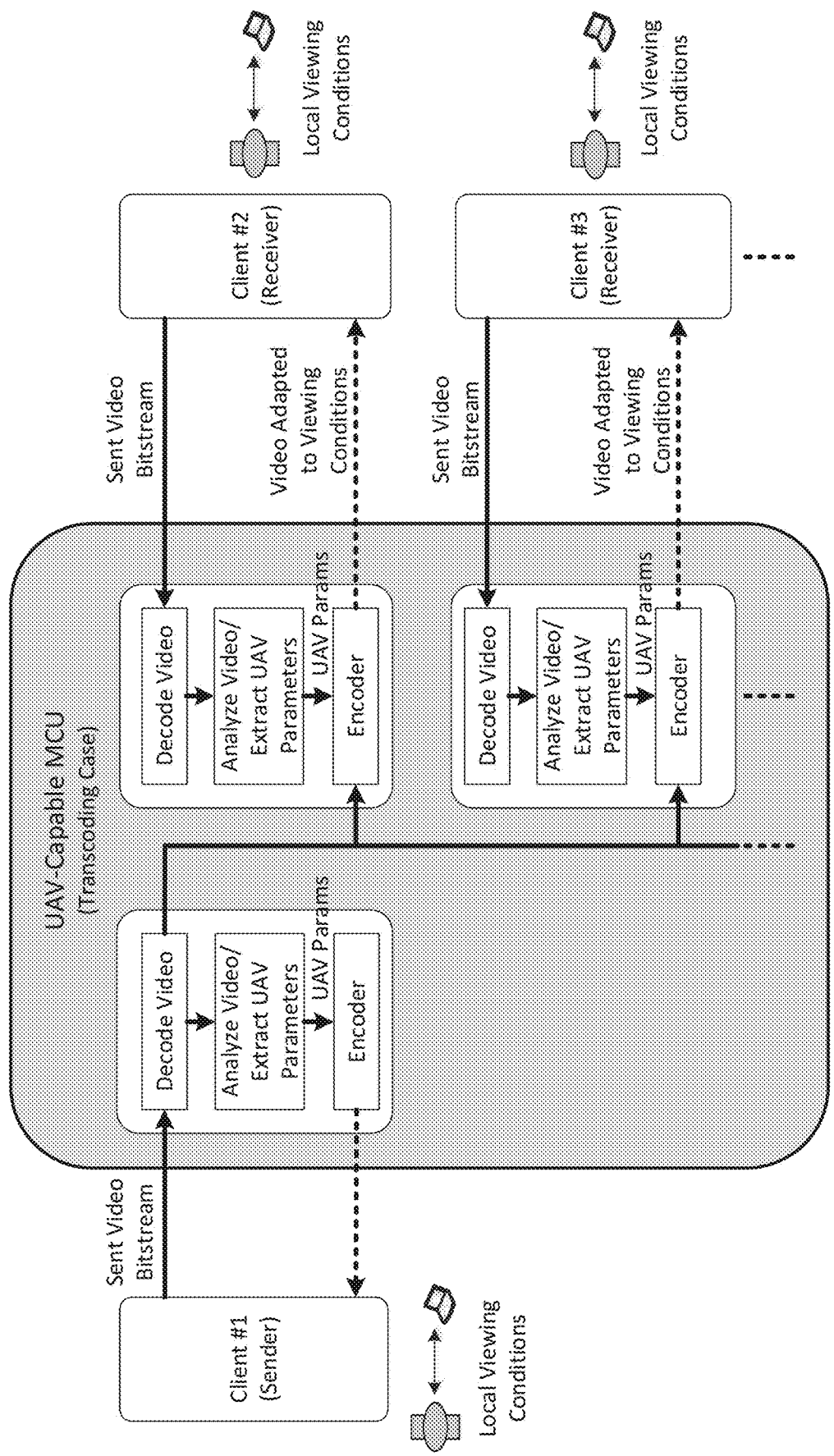
FIG. 19B is a diagram illustrating another example of an MCU implementing UAV with an encoder per client endpoint for multiple clients.

FIG. 19B illustrates an example of an encoder configuration where video from one client may be sent to multiple receiving clients (e.g., devices). The MCU may receive video content (e.g., a video stream) from multiple clients. The MCU may send the video content to the multiple clients (e.g., simultaneously). One or more, or each client may have local viewing conditions. The MCU may analyze the video content received from one or more, or each, of the multiple video clients. The MCU may determine one or more UAV viewing parameters based on the analysis of the video content. The one or more UAV viewing parameters may describe the local viewing conditions at one or more, or each, of the clients. The UAV viewing parameters may include viewing distance, user presence, user attentiveness, and/or ambient illuminance, etc. The MCU may modify (e.g., adapt) the video content sent to a client based on the one or more UAV viewing parameters which describe local viewing conditions at the client. The MCU may determine how to encode the video content to be sent to a client based on one or more UAV viewing parameters from the client.

FIG. 19B highlights an example particular video path to illustrate the adaptation of video to multiple clients. Client #1 may send video content in the form of a sent video stream (e.g., a video bit stream) to the MCU. The MCU may decode the video content from Client #1. The MCU may analyze the video content. The MCU may determine one or more UAV viewing parameters (e.g., distance between user and display) associated with Client #1 by analyzing the video content. The MCU may receive video content sent from other clients (e.g., Client #2, Client #3, etc.). The MCU may receive the video content from other clients at the same time it receives the video content from Client #1. The MCU may analyze the video content from the other clients. The MCU may determine one or more UAV viewing parameters, which may describe the local viewing conditions at the other clients, by analyzing the video content from the other clients. The MCU may utilize the determined UAV viewing parameters for the other clients to encode the video content from Client #1 (e.g., in order to adapt the video content to the local viewing conditions at the other clients, among other reasons). As illustrated in FIG. 19B, UAV viewing parameters, determined from analysis of the video content from Client #2, may be passed to an encoder which may encode the video content from Client #1. The UAV viewing parameters may be used to adapt (e.g., modify) the video content of Client #1 to the local viewing conditions at Client UAV viewing parameters determined from analysis of the video content from Client #3 may be passed to an encoder which may encode the video content from Client #1. The UAV viewing parameters may be used to adapt (e.g., modify) the video content of Client #1 to the local viewing conditions at Client #3. Video adaptation (e.g., modification) may be extended to any number of clients which may be sending video to and/or receiving video from the MCU.

Figure 20:
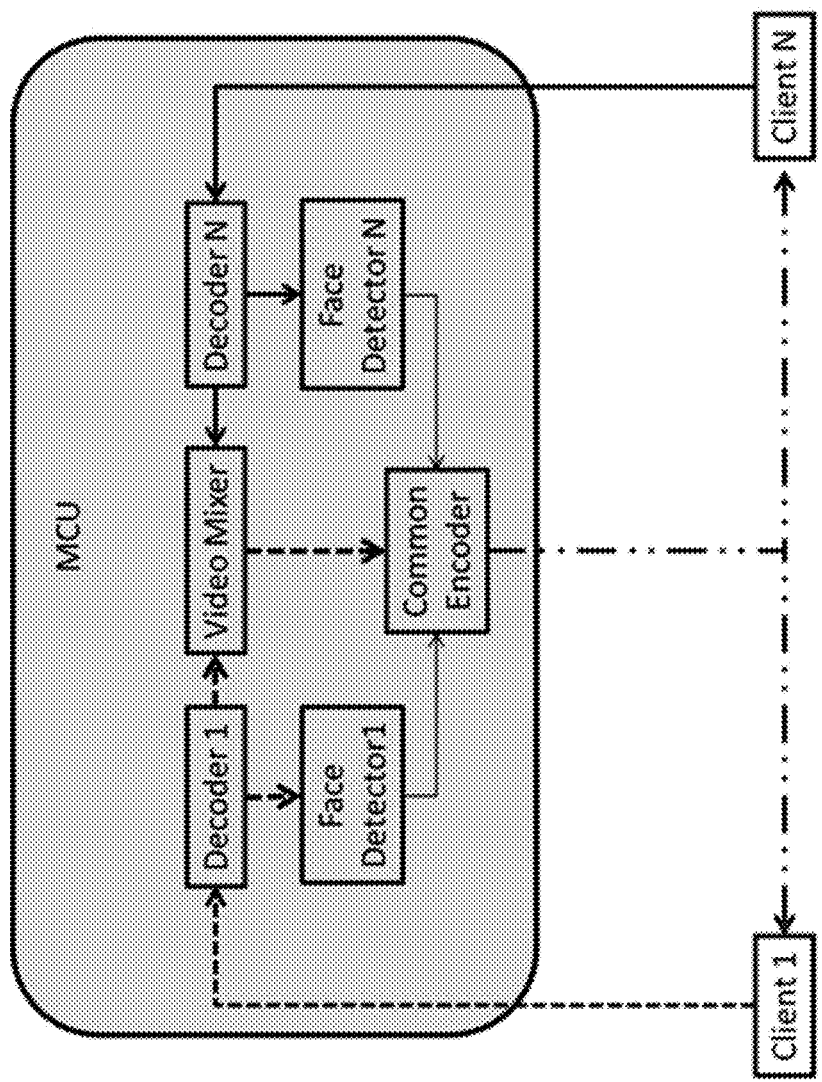
FIG. 20 is a diagram illustrating an example of an MCU with video mixing and a shared encoder.

FIG. 20 depicts an example of an MCU with video mixing and a shared encoder. The shared encoder may be a single encoder. The shared encoder (e.g., a single encoder) may be shared among a variety of endpoints, as shown in FIG. 20. The shared encoder may be used with a continuous presence video mixer. The MCU may include a face detector. The MCU may include a face detector for each endpoint (e.g., each connected client endpoint) such that faces may be detected in any or all of the video steams received by the MCU. The shared encoder may receive input from the face detector corresponding to an endpoint. The shared encoder may receive input from one or more, or all, face detectors corresponding to endpoints which may receive the video. The face detector corresponding to an endpoint may determine a viewing parameter based on the viewing conditions at the endpoint. The encoder may modify the video based on the viewing parameter. The encoder may modify the video based on a "worst case" selection amongst viewing conditions of multiple endpoints (e.g., to reduce bitrate without impacting the quality perceived by the most critical viewer, among other reasons). For example, the viewing distances from one or more, or all, the clients receiving the encoded video content may be estimated using face detection. The smallest estimated viewing distance may be used to adapt (e.g., modify) the video (e.g., the video encoding process).

One or more clients may provide UAV viewing parameters to the MCU. The UAV viewing parameters may include viewing distance, user presence, user attentiveness, ambient illuminance, and/or display properties such as display size and/or display resolution, among others. The UAV viewing parameters may be signaled from the client to the MCU. The UAV viewing parameters may be signaled using a call setup protocol and/or a call control protocol (e.g., H.245, SIP, etc.). The MCU may use a UAV viewing parameter to adapt (e.g., modify) the encoding of video content sent to that client. The MCU may modify the video content when UAV viewing parameters are explicitly signaled by a client. The client may send viewing parameters associated with face detection to the MCU.

The MCU may perform one or more of the orientation adaptation techniques described herein. The MCU may act as a video sender and/or may perform the adaptation tasks attributed to the sender. A video receiver client may receive video from the MCU. The video receiver client may send orientation information (e.g., one or more viewing parameters) to the MCU. The orientation information may include the height and/or width of the video pictures which the video receiver may find useful to receive. The orientation information may include an "up direction" for the video picture. The MCU may analyze the video (e.g., the features of video) received from a client to infer the orientation information of that client. The MCU may infer the orientation information without explicit signaling of the orientation information from that client. For example, the MCU may calculate the angle between a door frame and a length direction of the video. The MCU may adapt (e.g., modify) video sent to the video receiver client using the various techniques described herein (e.g., sender-side cropping, sender-side down-sampling, image resampling, image rotation, and/or the like). The MCU may modify the video based on the orientation information. The MCU may adapt (e.g., modify) the orientation of video content received from a sending client. The MCU may modify the orientation of video content before sending the video content on to a receiving client. The MCU may tailor (e.g., individually tailor) the orientation adaptation to one or more of the multiple clients. The MCU may tailor the orientation adaptation based on orientation information received from one or more of the multiple video clients.

A device may control a video communication via traffic shaping. The device may include an MCU. The device may receive a first video stream from a first device and a second video stream from a second device. The device may determine a viewing parameter associated with the first device by analyzing the first video stream. The viewing parameter may include a user viewing parameter, a device viewing parameter, and/or a content viewing parameter. The device may determine, based on the viewing parameter, a video stream bit rate for the second video stream. The device may indicate the video stream bit rate to the second device. The device may indicate the video stream bit rate by removing one or more packets from the second video stream before sending to the first device.

Figure 21:
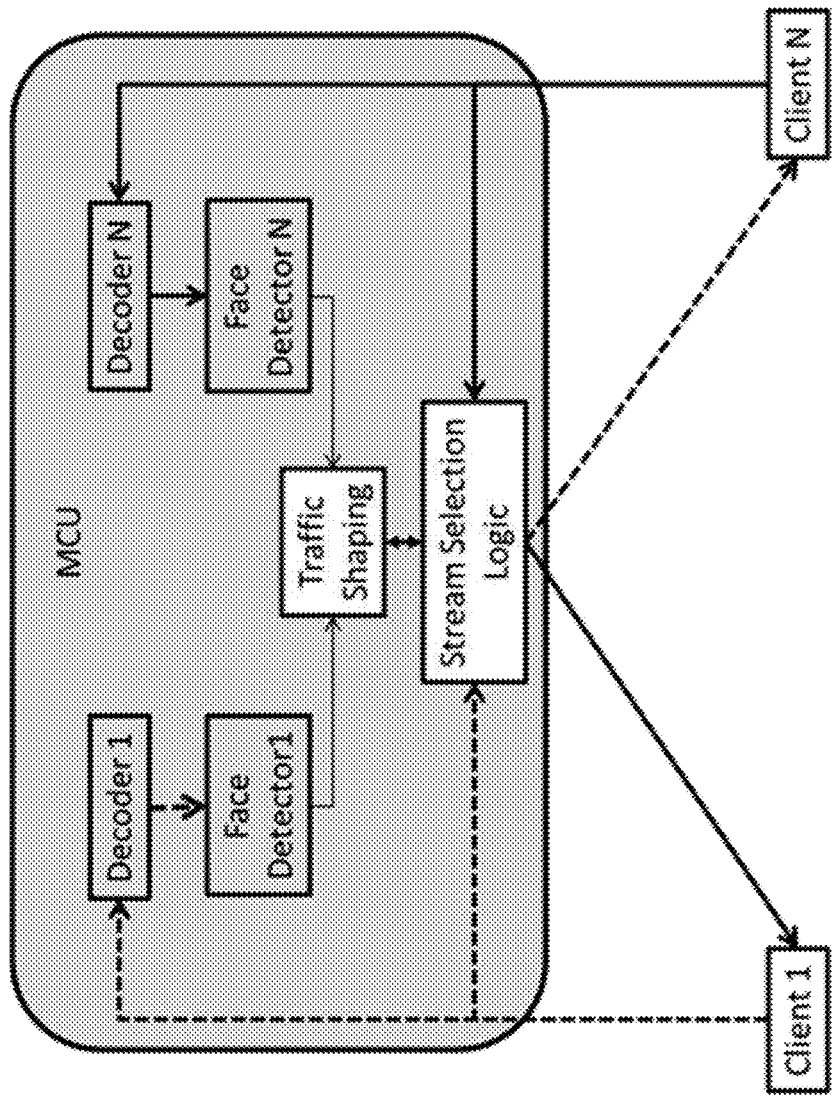
FIG. 21 is a diagram illustrating an example of an MCU traffic shaping technique for UAV.

FIG. 21 illustrates an example of a technique in which the MCU may influence the encoding rate of one or more sending clients. The MCU may determine one or more UAV viewing parameters for a client. The MCU may detect viewing condition information (e.g., the viewing position) of the $N^{th}$ client based on analysis of the video stream from the $N^{th}$ client. N may refer to a connected client. The MCU may determine (e.g., compute) the viewing distance of the $N^{th}$ client by monitoring the video from the $N^{th}$ client. The viewing distance may influence the encoder, which may be encoding video sent to the MCU, to implement UAV. The encoder may not be in the MCU. The encoder may be part of a client endpoint that sends video to the MCU. The MCU may switch video traffic with or without transcoding the video streams. The MCU may monitor the video traffic to detect faces, as illustrated in FIG. 21. The MCU decoded image might not be seen, perhaps except by the face detector, which may permit complexity reductions in the decoder (e.g., where appropriate). For example, the face detector might not operate at the full frame rate at which the sender encoded the video, in which case the decoder that provides decoded video to the face detector, may operate at less than the full frame rate.

The decoder may decode intra-coded frames (e.g., frames without prediction in time). In an embodiment, the decoder may decode only intra-coded frames. The video stream may have various layers. The decoder may decode a subset of the full video (e.g., a reduced frame rate or resolution). The decoder may decode a subset of the full video. The detected viewing condition information may be signaled directly or indirectly to the encoding client device (e.g., the client device encoding the video). The viewing condition information may influence an encoder at another client. The viewing condition information may be signaled directly or indirectly to the encoder at another client. The $i^{th}$ client may adjust (e.g., modify) its encoded bit rate based on an observed channel bandwidth. The bandwidth use of the encoder of the $i^{th}$ client may be influenced by shaping the measurements on the video traffic originated from the $i^{th}$ encoder. The stream selection logic may control which clients are connected to which other clients. The stream selection logic may control which video streams the MCU routes to which clients. The encoded output of the $i^{th}$ client may be seen by one or more (e.g., several) other clients, say $C=\{j_1, j_2, \ldots j_k\}$. For one or more, or each client, i, the MCU may monitor determine) viewing distances of clients in C that this client's video may be sent to. The traffic originating from the $i^{th}$ encoder may be shaped to correspond to the bandwidth reduction corresponding to the nearest of the clients in C.

The MCU may shape the traffic using one or more of the following:

The MCU may "trick" a video sender to decrease a sending rate;

The MCU may throttles the throughput;

The MCU may intentionally drop, mark and/or delay packets; and/or

The MCU may employ signaling to instruct the sender to change its sending bitrate.

Figure 22:
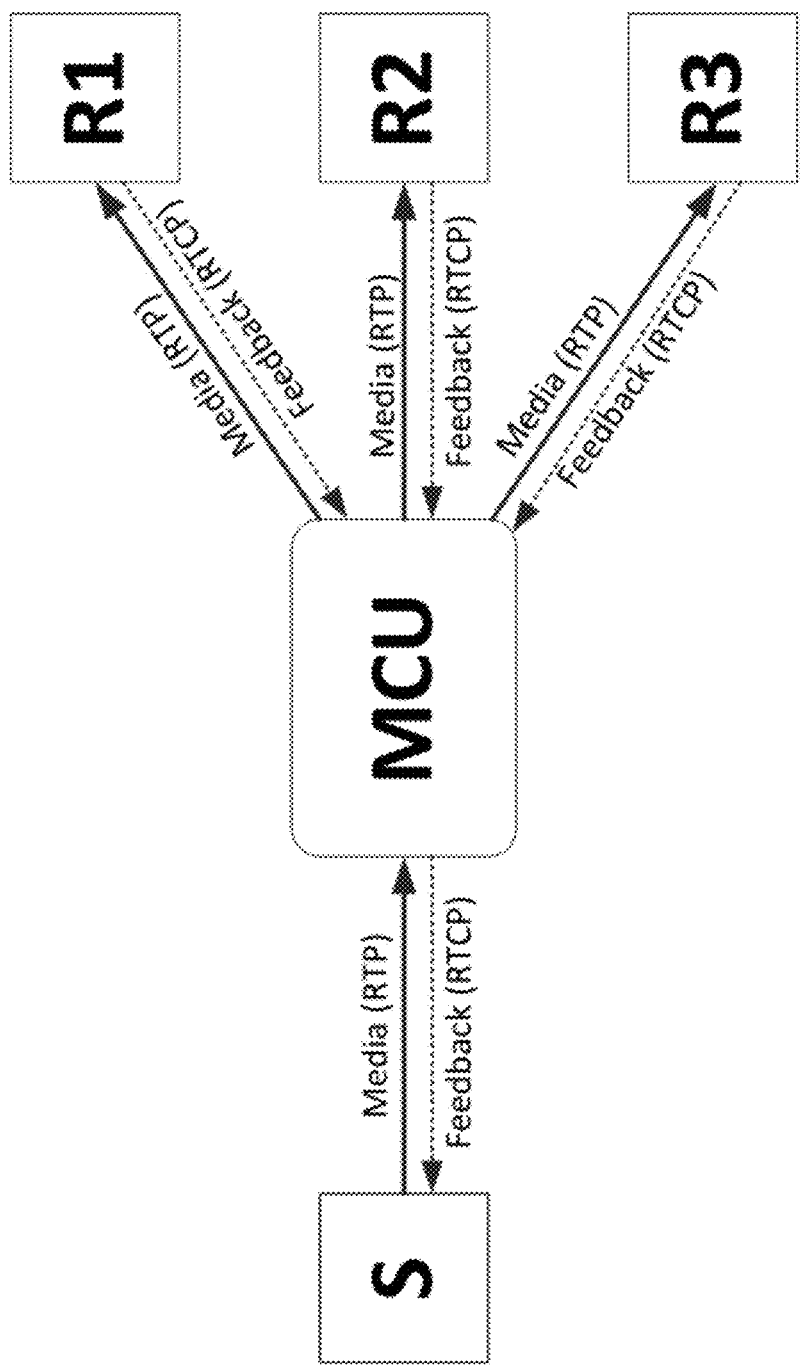
FIG. 22 is an illustration example logical connection among one or more video conferencing participants and an MCU.

FIG. 22 illustrates an example logical connection among video conferencing participants and the MCU. With reference to FIG. 22, the media data may be sent from a sender S to the MCU. The MCU may send the media data to the other participants (R1, R2, and R3). One or more, or each, participant may have a separate connection (e.g., RTP/UDP) with the MCU. In some embodiments, there might be a network between S and MCU, and/or between MCU and R1, and so on, and this is not shown in FIG. 22 for simplicity.

A device may indicate the video stream bit rate by sending a feedback message that indicates an adjusted packet loss rate. The device may include an MCU. The device may measure a packet loss rate for the second video stream. The device may determine the adjusted packet loss rate for the second video stream. The adjusted packet loss rate may be associated with the determined video stream bit rate. The adjusted packet loss rate may differ from the measured packet loss rate. The device may generate a feedback message that indicates the adjusted packet loss rate. The device may send the feedback message to the second device.

The device (e.g., the MCU) may "trick" (e.g., create artificial conditions and/or values, among other manipulations, or the like) a video sender, for example to decrease the sending rate, among other reasons. For example, WebRTC may implement congestion control to adapt (e.g., modify) the sending rate of the video to the available bandwidth in the network (e.g., so that WebRTC may be TCP friendly). The sending rate of the video may be reduced when a packet loss rate increases. The packet loss rate may be measured (e.g., determined) by a receiver. The receiver may include the MCU. The receiver may include a client device. The measurement of packet loss rate may be sent to the video sender. The packet loss rate may be sent periodically. Referring to FIG. 22, the MCU may receive a media flow (e.g., a video stream) originating from a sender S. The MCU may indicate a packet loss rate higher than the measured packet loss rate (e.g., by leveraging the feedback mechanism). The adjusted (e.g., inflated) packet loss rate may be determined (e.g. determined by the MCU) based on a bit rate (e.g., the target bit rate) corresponding to one or more viewing parameters. The adjusted packet loss rate may be based on a determined video stream bit rate for the sender. The MCU may generate a feedback message that indicates the adjusted packet loss rate. The MCU may send the feedback message to a device (e.g., the sender). The adjusted packet loss rate may be based on a "worst-case" viewing condition (e.g., nearest viewing distance of the other participants). The MCU may determine an adjusted packet loss rate higher than the measured packet loss rate (e.g., in order to reduce the sending bit rate of sender S). The MCU may determine an adjusted packet loss rate lower than the measured packet loss rate (e.g., so that the sending bit rate of sender S increases).

WebRTC may include a congestion control mechanism. The sender and/or the receiver may estimate the available bandwidth. The sender side estimate $A_s(t_k)$ at time $t_k$ may be as follows:

$$A_s(t_k) = \begin{cases} \max\{X(t_k), A_s(t_{k-1})(1.05 p(t_k))\}, & \text{if } p(t_k) > 0.10 \\ 1.05(A_s(t_{k-1}) + 1 \text{ kbps}), & \text{if } p(t_k) < 0.02 \\ A_s(t_{k-1}), & \text{otherwise} \end{cases}$$

where $p(t_k)$ is the packet loss rate at time $t_k$ and where $X(t_k)$ is the TCP friendly rate $$X(t_k) = \frac{8s}{RTT\sqrt{2\ bp(t_k)/3} + RTO\left(3\sqrt{\frac{3\ bp(t_k)}{8}}\right)p(1 + 32p^2(t_k))},$$

where s is the TCP segment size, RTT is the round trip time, RTO is the TCP retransmission timeout (e.g., set to 4RTT), and b is the maximum number of packets acknowledged by a single TCP acknowledgement. The actual maximum sending rate A that can be used may be limited by the available bandwidth estimate of the receiver $A_r(t_k)$:

A←min{$A_s(t_k)$, $A_r(t_k)$}; and $p(t_k)$ may be measured by the receiver and/or fed back to the sender. From the above formula, the packet loss rate $p(t_k)$ may be used by the MCU as a "knob" (e.g., control point) to control the video sending rate (e.g., video stream bit rate).

A target bit rate may be used to determine $p(t_k)$. The target bit rate may be determined based on a video codec, size of the video to be rendered, and/or other information. The target hit rate may correspond to a human's perception limit.

Calculation of the viewing angle may be based on the viewing distance and/or the size of the video. A bit rate corresponding to the minimum viewing angle that is greater than or equal to the calculated viewing angle may be found in a pre-computed table, such as Table 1:

TABLE 1

Example Viewing Angles

| resolution | width | height | bit rate (Kbps) | Ambient contrast | Viewing angle (°) |
|---|---|---|---|---|---|
| "720 p" | 1280 | 720 | 3000. | | |
| "720 p__A28" | 1280 | 720 | 2700. | 200:1 | 28.24 |
| "720 p__A16" | 1280 | 720 | 2300. | 200:1 | 16.36 |
| "720 p__A14" | 1280 | 720 | 2000. | 200:1 | 14.33 |
| "480 p" | 854 | 480 | 1400. | | |
| "360 p" | 640 | 360 | 900. | | |
| "240 p" | 428 | 240 | 400. | | |

A viewing angle (e.g., in degrees) may be calculated as follows: $(360/\pi)$ arctan(w/(2αd)), where α is the monitor resolution in (pixels per inch), w is the width of the video in pixels, and arctan is the arc tangent function. For example, when the resolution of the video is 720 p and the calculated angle is 15 degrees, then, based on Table 1, the desired bit rate may be 2300 Kbps.

The MCU may maintain a database, including tables, one or more, or each, of which may correspond to a video codec (e.g., H.264/AVC, HEVC). A viewing parameter (e.g., the width and/or height of the video) may be obtained determined during the call set up (e.g., H.245, SIP/SDP). The MCU may know the width and/or height of the video to be displayed to one or more, or each, participant.

The MCU may take a control system approach (e.g., when the MCU does not know the exact rate control algorithm implemented in the video sender). The MCU may adjust (e.g., incrementally increase and/or decrease) the reported packet loss rate. The MCU may adjust the reported packet loss rate until it observes a bit rate close to a target bit rate (e.g., a determined video stream bit rate). For example, suppose that the reported packet loss rate is p1, at time t1. The MCU may measure the bit rate (e.g., the actual bit rate) of the video stream. The MCU may adjust (e.g., increase) the reported packet loss rate to p3=p1+δ, at time t2, for example perhaps if the actual bit rate is higher than the target bit rate, among other reasons. The MCU may further increase the reported packet loss rate to p3=p1+2δ, for example perhaps if the measured bit rate is still higher than the target bit rate, among other reasons. The MCU may determine a desired packet loss rate p2, for example perhaps if the measured bit rate may now be lower than the target bit rate, among other reasons. The MCU may delay the transmission of certain packets such as the ACKs (e.g., to trick the video sender on the value for RTT). An increase in RFT may result in a decrease in the estimated bandwidth.

Tricking the video sender, as described herein, by generating and/or modifying feedback messages may be applied more generally to a scenario not involving an MCU. For example, a first device may receive a video stream from a second device. The first device may generate and/or may modify feedback messages sent from the first device to the second device using any of the techniques described herein (e.g., increasing or decreasing reported packet loss rates, delaying transmission of ACK packets, etc.) In order to influence the second device to modify the bit rate used by the second device to encode the video stream sent from the second device to the first device. For example, the first and second devices may be client endpoints in a video session not involving an MCU.

A device may signal the video stream bit rate by signaling a bandwidth limit. The device may include an MCU. The device may determine a first viewing parameter for the first device and a third viewing parameter for a third device. The first viewing parameter may be associated with the first video stream which may be sent to the device from the first device. The third viewing parameter may be associated with a third video stream which may be sent to the device from the third device. The device may determine a first video stream bit rate for the second video stream and/or a second video stream bit rate for the second device. The first video stream bit rate may be based on the first viewing parameter. The second video stream bit rate may be based on the third viewing parameter. The device may signal a bandwidth limit to the second device. The bandwidth limit may be associated with the first video stream bit rate and/or the second video stream bit rate. The bandwidth limit may control the bit rate of video encoded by the second device. The bandwidth limit may control the bit rate of video sent from the second device to the device.

The MCU may throttle the throughput (e.g., if the MCU acts as a router). The MCU may set a limit (e.g., cap) on the bandwidth for the media flow to the MCU (e.g., to throttle the throughput). The MCU may determine the bandwidth limit (e.g., bandwidth cap) by a bit rate (e.g., a target hit rate) corresponding to the "worst-case" viewing condition (e.g., a nearest viewing distance) of the participants. A video sender may receive the bandwidth limit and may infer an available bandwidth lower than the actual bandwidth. For example, feedback from a receiving client may be sent to the video sender. The video sender may infer an available bandwidth based on the feedback from the receiving client. The RTCP protocol may include feedback from a receiver (e.g., a receiving client connected via the MCU to the video sender) that may indicate the received throughput (e.g., indicate effective bandwidth to a sender). The video sender may adjust the transmission rate (e.g., bit rate) to fit within the capacity of a network, for example if the MCU sets a bandwidth limit. The MCU may increase the bandwidth limit allocated to the incoming media flow so that the video sender (e.g., S in the FIG. 22) can increase its bit rate (e.g., when it may be useful for the target bit rate to be increased).

The MCU may intentionally drop packets from a video traffic flow whose bit rate may be higher than the bit rate corresponding to a "worst-case" viewing condition (e.g., a shortest of the viewing distances) of one or more, or all, clients that receive (e.g., watch) the video traffic flow. The intentional packet dropping rate may be reduced (e.g., when the target bit rate increases).

The MCU may utilize signaling to instruct the sending client what video bit rate to send. The MCU may utilize signaling to inform the sending client of a maximum bit rate for sending the video content. The signaling may be proprietary signaling. The proprietary signaling may specify a target bit rate and/or a maximum bit rate for the video content. The MCU and/or the clients may utilize a standard signaling mechanism for signaling the video bit rate. For example, the MCU may use an H.245 Flow Control command to instruct the sending client of a maximum bit rate to use for the logical channel which carries video from the sending client to the MCU. The MCU may use the H.245 Flow Control command if the call session between the MCU and a client terminal may be based on the H.323 standard. The MCU may influence and/or control the bit rate used by the sending client without the need to drop packets and/or alter the RTCP feedback reports.

One or more clients may provide a UAV viewing parameter to the MCU. The UAV viewing parameter may include viewing distance, user presence, user attentiveness, ambient illuminance, and/or display properties such as display size and/or display resolution. The UAV viewing parameter may be signaled from the client to the MCU. For example, the UAV viewing parameter may be signaled using a call setup protocol and/or a call control protocol (e.g., H.245, SIP, etc.). The MCU may use the UAV viewing parameter to modify (e.g., adapt) the encoding of video content sent to the client (e.g., if the UAV viewing parameter is explicitly signaled by a client). The UAV viewing parameters which may be determined (e.g., derived) from face detection and/or other monitoring of the video may be sent from a client (e.g., explicitly provided by the client).

UAV via traffic shaping may be implemented in a router or a similar network entity. For example, UAV may be performed inside a router and/or a similar network entity which may not have transcoding capabilities. UAV may be performed in a router instead of inside a MCU. The network entity may include an Access Point (AP) in a Wi-Fi network, an eNB, or a P-GW in an LTE network. The video traffic may flow in bath directions. The video traffic may go through a common network entity. The common network entity may include a gateway type of device such as an AP, eNB, or a P-GW.

The UAV via traffic shaping in a network entity system architecture may be similar to the architecture illustrated in FIG. 21. A network entity may decode video content. The network entity may perform face detection on the decoded video content. The network entity may use the output of the face detector for a first video stream traffic flow) to shape a second video stream (e.g., traffic flow) in the other direction. The video traffic shaping technique may include those techniques described herein. UAV via traffic shaping may intentionally drop/delay/mark video packets that pass through the network entity. The video traffic shaping method may include tricking the video sender into decreasing a sending bit rate. For example, the network entity may trick the video sender into decreasing the sending bit rate by adjusting (e.g., intercepting and/or modifying) the packet loss feedback report. The modified packet loss feedback report may show a higher packet loss rate than the rate actually observed by the receiver (e.g., the receiving endpoint). The packet loss feedback report may include an RTCP receiver report, One or more clients may provide a UAV viewing parameter to the MCU. The UAV viewing parameter may include viewing distance, user presence, user attentiveness, ambient illuminance, and/or display properties such as display size and/or display resolution. The UAV viewing parameter may be signaled from the client to the MCU. For example, the UAV viewing parameter may be signaled using a call setup protocol or a call control protocol (e.g., H.245, SIP, etc.). The MCU may modify (e.g., adapt) the encoding of video content sent to that client based on the UAV viewing parameter. The MCU may modify the encoding of video content if such parameters may be explicitly signaled by a client. A UAV viewing parameter which may be derived from face detection and/or other monitoring of the video sent from a client may be provided (e.g., explicitly provided) by the client.

UAV may be performed via the "cloud." UAV via transcoding and/or UAV via traffic shaping may achieve UAV without requiring any changes to the client.

UAV may be implemented without degrading the perceived video quality. UAV may be implemented without making any changes to the client. The client may encode the content (e.g., video content) directly, perhaps based on a UAV viewing parameter. The UAV viewing parameter may include the viewer's viewing distance and/or circumstance, such as lighting conditions, among others. The client may send the content directly to the peer clients. The client may send information from a client to a server. A UAV program may run the server. The server may control the client "on-the-fly" (e.g., real time). The server may send commands to the client. The client may respond to the commands sent from the server to achieve UAV. The server (e.g., the UAV program on the server) may send a command and/or a request to the client. The command and/or request may include modify the video encoding/sending bit rate of the client, change the video resolution at which the client sends video, prefilter and/or remove some level of detail from the video before encoding it, and/or otherwise adapt the video content sent.

Figure 23:
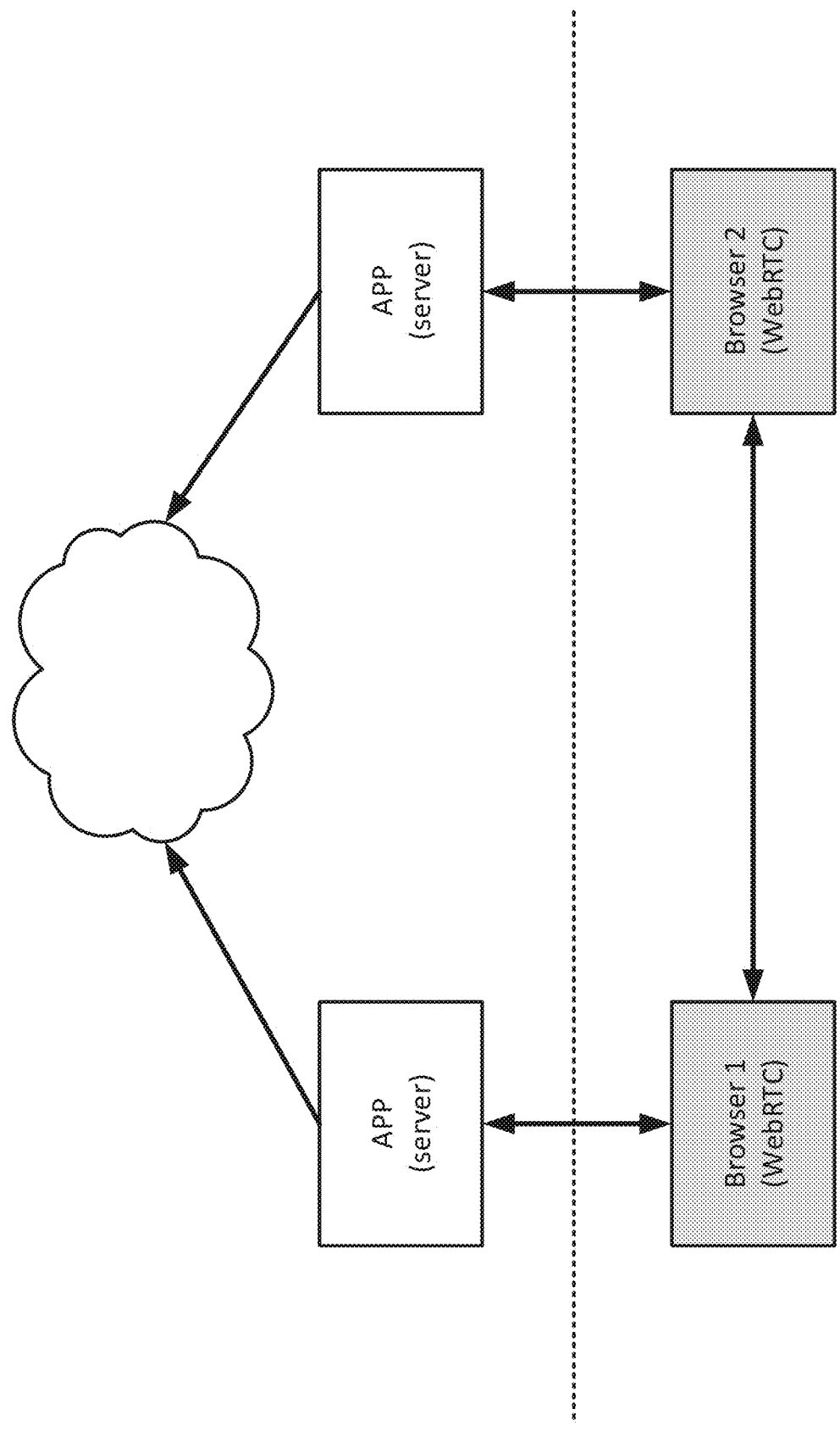
FIG. 23 is a diagram illustrating an example architecture of a system in which a UAV application operates via the Cloud.

The client to server communications may be supported by websocket+javascript. A client that may respond to server commands may be supported by the Chrome/Firefox/Opera+WebRTC. The client may support other browsers by installing WebRTC plugins, for example. WebRTC (Web Real-Time Communication) is an API definition being drafted by the World Wide Web Consortium (W3C). Web RTC enables browser-to-browser applications for voice calling, video chat, and P2P file sharing without plugins. FIG. 23 shows an example architecture of a WebRTC system.

One or more mechanisms or techniques may be implemented to send information from the client to the server and/or to control the client from server "on-the-fly." Referring to FIG. 23, UAV may be implemented in air APP server. The APP server may determine (e.g., estimate) viewing conditions. The viewing conditions may include face-detection, ambient lighting estimation, etc. The APP server may run along with an HTTP server, a SIP server, an application server, or another device located somewhere in the cloud.

One or more browser clients may share the same APP server. One or more browser clients may each have their own APP server (e.g., to achieve UAV). An APP server may communicate with a second APP server in order to enable UAV for a video conferencing session. For example, the APP servers may communicate via a signaling path. Client-to-client and/or client to APP server signaling may facilitate communication between APP servers. For example, a first client may identify a first APP server to a second client during the setup of a video communication session. The second client may identify the first APP server of the first client to a second (e.g., its own) APP server. The first APP server and the second APP server may discover each other and may begin communicating. The first client may introduce the first APP server to the second client and/or the second APP server. The second client may introduce the second APP server to the first client and/or the first APP server.

The communications between a server and a client may implement WebSocket. WebSocket provides for full-duplex communication. Full-duplex communications between the client and server may be provided by XMLHttpRequest (XHR)+Google App Engine Channel API. Google App Engine may enable building and/or running applications on Google's infrastructure.

Sensor information from the client may be collected and/or communicated to the server via javascript (e.g., since the clients may be web browsers). Javascript collection and communication of sensor information may be supported in Windows and/or Linux. The collection may include screen captures, parsed multimedia from the compressed media, and/or samples of frame captures from the camera output. The collection and/or transmission via WebSocket to the server may enable the server to perform the computer vision related functions and/or offload the computer vision related functions from the client.

A client may utilize WebRTC to respond to a command from a server. The encoding may be performed in real-time and/or there are APIs that may enable adjusting the frame resolution. WebRTC may adjust (e.g., adapt) the video resolution during the capturing and/or encoding. A first adjustment (e.g., first adaptation) may be based on the camera resolution (e.g., VideoAdapter::AdaptFrame method). A second adjustment (e.g., second adaptation) may be based on channel conditions and/or buffer fullness (e.g., via the resize_key_frame function).

Figure 24:
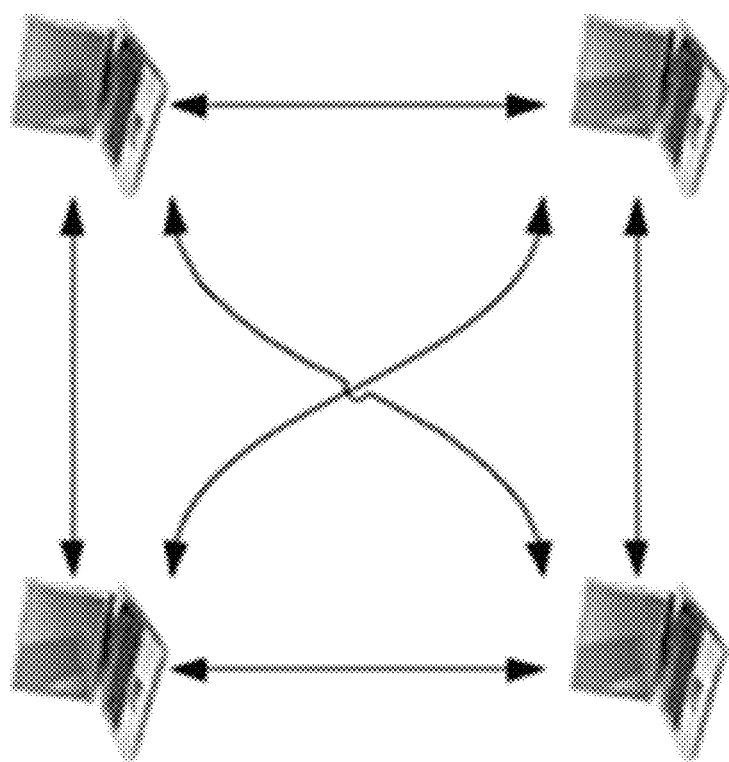
FIG. 24 is an illustration of an example mesh configuration for Web Real-Time Communication (RTC).

A first resolution adaptation (e.g., camera resolution) may be utilized to achieve a dynamic resolution change. The first resolution adaptation may be based on one or more commands from the server to the client. A getUserMedia API for WebRTC defined by W3C may enable the dynamic resolution change. A second resolution adaptation in WebRTC may be utilized. The second resolution adaption may require changes to the WebRTC stack inside the encoder loop. Bit rate adaptation may be utilized. Bit rate adaptation may be utilized when an encoding bit rate may be set and/or influenced by a WebRTC:

A WebRTC app may use multi-party connections (e.g., multiple RTCPeerConnections) so to that one or more, or every, endpoint may connect to one or more, or every, other endpoint in a mesh configuration. An example multi-party connection mesh configuration is illustrated in FIG. 24. Applications (e.g., talky.io) may work well for a small handful of peers. The UAV APP may run somewhere in the cloud. The UAV APP may send multiple commands to one or more, or each endpoint (e.g., one for each of their connections). A WebRTC application may select one endpoint to distribute streams to one or more, or all, others. The WebRTC may distribute streams in a star configuration. A WebRTC endpoint may run on a server. The WebRTC endpoint may cooperate with a unique and/or proprietary redistribution mechanism.

For multi-party connections, a UAV APP may be run on the server when a video mixer is not used. When a video mixer is used, a worst case selection amongst viewing conditions may be made to reduce the bitrate. The worst case selection may not impact the quality of a critical viewer (e.g., a most critical viewer—perhaps the viewer with the shortest viewing distance). A MCU may be used for multi-party connections with a UAV APP run on a server. The UAV APP server may be run in the same node as the MCU. UAV may be implemented without transcoding.

The processes and instrumentalities described herein may apply in any combination, may apply to other wireless technology, and for other services (e.g., not limited for proximity services).

A WTRU may refer to an identity of the physical device, or to the user's identity such as subscription related identities, e.g., MSISDN, SIP URI, etc. WTRU may refer to application-based identities, e.g., user names that may be used per application.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, UE, terminal, base station, RNC, and/or any host computer.

What is claimed:

1. A first wireless transmit/receive unit (WTRU) comprising:
   a memory; and
   a processor configured to:
      receive an incoming video stream from a second WTRU;
      decode incoming video content of the incoming video stream;
      display the decoded incoming video content on a first screen of the first WTRU;
      analyze the decoded incoming video content to determine a property of a viewing environment in which the second WTRU is operating, the property of the viewing environment comprising at least one of a presence of a user in a vicinity of the second WTRU, a user's distance from a second screen of the second WTRU, or an ambient lighting condition associated with the second WTRU;
      capture video content using a camera of the first WTRU;
      encode the captured video content to produce an outgoing video stream, wherein the captured video content is encoded based on the determined property of the viewing environment in which the second WTRU is operating; and
      send the outgoing video stream to the second WTRU.

2. The first WTRU of claim 1, wherein the processor is further configured to determine an amount of detail that a user of the second WTRU could perceive based on the determined property of the viewing environment in which the second WTRU is operating, and wherein one or more details that are greater than the determined amount of detail that the user of the second WTRU could perceive are removed from the captured video content in the outgoing video stream.

3. The first WTRU of claim 1, wherein the processor is further configured to perform a two-way video communication session between the first WTRU and the second WTRU, the two-way video communication session comprising exchange of the incoming video stream and the outgoing video stream.

4. The first WTRU of claim 1, wherein the processor is further configured to:
   adjust the capture of the video content; or
   modify a re-sampling of the outgoing video stream.

5. The first WTRU of claim 4, wherein the processor being configured to adjust the capture of the video content comprises the processor further configured to crop the captured video content prior to being encoded.

6. The first WTRU of claim 1, wherein the processor being configured to analyze the decoded incoming video content comprises the processor further configured to analyze one or more images of the decoded incoming video content.

7. The first WTRU of claim 1, wherein the processor is further configured to detect a change in the determined property of the viewing environment in which the second WTRU is operating.

8. The first WTRU of claim 7, wherein the processor is further configured to adjust the encoding of the captured video content based on the detected change.

9. The first WTRU of claim 7, wherein the processor is further configured to adjust the capture of the video content.

10. A method performed by a first wireless transmit/receive unit (WTRU) in a two-way video communication, the method comprising:
    receiving an incoming video stream from a second WTRU;
    decoding incoming video content of the incoming video stream;
    displaying the decoded incoming video content on a first screen of the first WTRU;
    analyzing the decoded incoming video content to determine a property of a viewing environment in which the second WTRU is operating, the property of the viewing environment comprising at least one of a presence of a user in a vicinity of the second WTRU, a user's distance from a second screen of the second WTRU, or an ambient lighting condition associated with the second WTRU;
    capturing video content via a camera associated with the first WTRU;
    encoding the captured video content to produce an outgoing video stream, wherein the captured video content is encoded based on the determined property of the viewing environment in which the second WTRU is operating; and
    sending the outgoing video stream to the second WTRU.

11. The method of claim 10, further comprising determining an amount of detail that a user of the second WTRU could perceive based on the determined property of the viewing environment in which the second WTRU is operating, and wherein one or more details that are greater than the determined amount of detail that the user of the second WTRU could perceive are removed from the captured video content in the outgoing video stream.

12. The method of claim 10, further comprising performing a two-way video communication session with the second WTRU, the two-way video communication session comprising exchange of the incoming video stream and the outgoing video stream.

13. The method of claim 10, further comprising:
    adjusting the capture of the video content; or
    modifying a re-sampling of the outgoing video stream sent to the second WTRU.

14. The method of claim 13, wherein adjusting the capture of the video content comprises cropping the captured video content prior to being encoded.

15. The method of claim 10, wherein analyzing the decoded incoming video content comprises analyzing one or more images of the decoded incoming video content.

16. The method of claim 10, further comprising detecting a change in the determined property of the viewing environment in which the second WTRU is operating.

17. The method of claim 16, further comprising adjusting the encoding of the captured video content based on the detected change.

18. The method of claim 16, further comprising adjusting the capture of the video content.

\* \* \* \* \*

UNITED STATES PATENT AND TRADEMARK OFFICE
CERTIFICATE OF CORRECTION

| | |
|---|---|
| PATENT NO. | : 11,356,638 B2 |
| APPLICATION NO. | : 15/957887 |
| DATED | : June 7, 2022 |
| INVENTOR(S) | : Yuriy Reznik et al. |

It is certified that error appears in the above-identified patent and that said Letters Patent is hereby corrected as shown below:

On the Title Page

(74) Attorney, Agent or Firm- delete "Condon" insert --Condo--

Signed and Sealed this
Thirtieth Day of August, 2022

*Katherine Kelly Vidal*

Katherine Kelly Vidal
*Director of the United States Patent and Trademark Office*